United States Patent
Oh

(10) Patent No.: US 11,156,252 B2
(45) Date of Patent: Oct. 26, 2021

(54) BOOT ASSEMBLY FOR A CONSTANT VELOCITY JOINT

(71) Applicant: DANA AUTOMOTIVE SYSTEMS GROUP, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 398 days.

(21) Appl. No.: 16/099,772

(22) PCT Filed: May 10, 2017

(86) PCT No.: PCT/US2017/031933
§ 371 (c)(1),
(2) Date: Nov. 8, 2018

(87) PCT Pub. No.: WO2017/196962
PCT Pub. Date: Nov. 16, 2017

(65) Prior Publication Data
US 2019/0178298 A1    Jun. 13, 2019

Related U.S. Application Data

(60) Provisional application No. 62/345,225, filed on Jun. 3, 2016, provisional application No. 62/412,385, filed on
(Continued)

(51) Int. Cl.
*F16D 3/84* (2006.01)
(52) U.S. Cl.
CPC ............ *F16D 3/845* (2013.01); *Y10S 464/906* (2013.01)
(58) Field of Classification Search
CPC ....... F16D 3/845; F16D 3/385; Y10S 464/906
(Continued)

(56) References Cited

U.S. PATENT DOCUMENTS 1,980,846 A    11/1934 Bradley
2,653,456 A    9/1953 Heym
(Continued)

FOREIGN PATENT DOCUMENTS

CN    1414257 A    4/2003
CN    102741578 A    10/2012
(Continued)

OTHER PUBLICATIONS

European Patent Office, International Search Report with Written Opinion issued in PCT/US2018/025200, dated Jul. 25, 2018, 13 pages, Rijswijk, Netherlands.
(Continued)

*Primary Examiner* — Greg Binda
(74) *Attorney, Agent, or Firm* — Marshall & Melhorn, LLC

(57) ABSTRACT

A joint assembly for a vehicle. The joint assembly incudes an outer race having a stepped portion with a chamfer portion circumferentially extending along an outer surface of an axially outermost end of a second end portion of the outer race. A first end portion of a flexible boot is connected to an outer surface of the outer race. Integrally connected to an inner surface of the boot is an adapter. Circumferentially extending from a first side of the adapter is an outer race mating portion having a size and shape complementary to the stepped and chamfer portions of the outer race. Extending radially inboard from the outer race mating portion is a substantially disc-shaped portion. A first side of the disc-shaped portion is in contact with the axially outermost end of the outer race and a second side is in contact with the inner surface of the boot.

16 Claims, 13 Drawing Sheets

Related U.S. Application Data on Oct. 25, 2016, provisional application No. 62/334,164, filed on May 10, 2016.

(58) Field of Classification Search
USPC ...... 464/173–175; 403/50, 51; 277/634–636; 74/18–18.2
See application file for complete search history.

(56) References Cited

U.S. PATENT DOCUMENTS

| | | | |
|---|---|---|---|
| 2,844,013 | A | 7/1958 | Spence |
| 3,162,026 | A | 11/1964 | Ritsema |
| 3,162,024 | A | 12/1964 | Breuer |
| 3,176,476 | A | 4/1965 | Cull |
| 3,186,189 | A | 6/1965 | Cull |
| 3,452,558 | A | 7/1969 | Cull |
| 3,464,232 | A | 9/1969 | Hutchinson |
| 3,540,232 | A | 11/1970 | Breuer |
| 3,789,624 | A | 2/1974 | Camosso |
| 3,802,221 | A | 4/1974 | Kimata |
| 3,858,412 | A | 1/1975 | Fisher |
| 4,034,576 | A | 7/1977 | Takahashi |
| 4,112,709 | A | 9/1978 | Krude |
| 4,191,031 | A | 3/1980 | Girguis |
| 4,196,598 | A | 4/1980 | Hirai |
| 4,205,925 | A | 6/1980 | Fisher |
| 4,229,952 | A | 10/1980 | Aucktor |
| 4,249,395 | A | 2/1981 | Harz |
| 4,319,467 | A | 3/1982 | Hegler |
| 4,320,632 | A | 3/1982 | Dore |
| 4,369,979 | A | 1/1983 | Werner |
| 4,392,838 | A | 7/1983 | Welschof |
| 4,395,247 | A | 7/1983 | Roberts |
| 4,403,781 | A | 9/1983 | Riemscheid |
| 4,411,549 | A | 10/1983 | Sheppard |
| 4,437,782 | A | 3/1984 | Geisthoff |
| 4,540,385 | A | 9/1985 | Krude |
| 4,558,869 | A | 12/1985 | Grove |
| 4,669,571 | A | 6/1987 | Kurde |
| 4,805,921 | A | 2/1989 | Ukai |
| 4,877,103 | A | 10/1989 | Nuutio |
| 4,967,609 | A | 11/1990 | Takagi |
| 5,201,107 | A | 4/1993 | Mazziotti |
| 5,222,914 | A | 6/1993 | Mazziotti |
| 5,236,394 | A | 8/1993 | Collins |
| 5,318,480 | A | 6/1994 | Essi |
| 5,376,052 | A | 12/1994 | Jacob |
| 5,529,538 | A | 6/1996 | Schulz |
| 5,580,313 | A | 12/1996 | Jacob |
| 6,010,409 | A | 1/2000 | Johnson |
| 6,085,797 | A | 7/2000 | Grabaum |
| 6,251,021 | B1 | 6/2001 | Jacob |
| 6,390,926 | B1 | 5/2002 | Perrow |
| 6,482,094 | B2 | 11/2002 | Kefes |
| 6,530,843 | B2 | 3/2003 | Miller |
| 6,540,616 | B2 | 4/2003 | Miller |
| 6,582,151 | B2 | 6/2003 | Hopson |
| 6,585,601 | B2 | 7/2003 | Booker |
| 6,709,338 | B2 | 3/2004 | Weckerling |
| 6,780,114 | B2 | 8/2004 | Sahashi |
| 6,793,581 | B2 | 9/2004 | Meyer |
| 6,793,584 | B2 | 9/2004 | Ramey |
| 6,926,612 | B2 | 8/2005 | Wang |
| 6,988,949 | B2 | 1/2006 | Wang |
| 7,008,325 | B2 | 3/2006 | Bongartz |
| 7,077,753 | B2 | 7/2006 | Kuczera |
| 7,097,563 | B2 | 8/2006 | Benson |
| 7,104,893 | B2 | 9/2006 | Ouchi |
| 7,204,760 | B2 | 4/2007 | Wang |
| 7,226,360 | B2 | 6/2007 | Lyon |
| 7,232,373 | B2 | 6/2007 | Hildebrandt |
| 7,238,114 | B2 | 7/2007 | Wang |
| 7,281,984 | B2 | 10/2007 | Foster-Hamilton |
| 7,326,199 | B2 | 2/2008 | MacFarland |
| 7,377,854 | B2 | 5/2008 | Wormsbaecher |
| 7,396,286 | B2 | 7/2008 | Sueoka |
| 7,435,182 | B2 | 10/2008 | Ichikawa |
| 7,488,259 | B2 | 2/2009 | Sueoka |
| 7,575,519 | B2 | 8/2009 | Dice |
| 7,607,984 | B2 | 10/2009 | Hopson |
| 7,607,985 | B2 | 10/2009 | Krude |
| 7,677,984 | B2 | 3/2010 | Hahn |
| 7,704,149 | B2 | 4/2010 | Yamazaki |
| 7,997,988 | B2 | 8/2011 | Wormsbaecher |
| 8,025,579 | B2 | 9/2011 | Kamikawa |
| 8,033,920 | B1 | 10/2011 | Benson |
| 8,070,613 | B2 | 12/2011 | Cermak |
| 8,157,660 | B2 | 4/2012 | Disser |
| 8,162,767 | B2 | 4/2012 | Holzhei |
| 8,172,691 | B2 | 5/2012 | Deisinger |
| 8,235,829 | B2 | 8/2012 | Kozlowski |
| 8,262,488 | B2 | 9/2012 | Takemura |
| 8,262,489 | B2 | 9/2012 | Valovick |
| 8,262,490 | B2 | 9/2012 | Langer |
| 8,287,393 | B2 | 10/2012 | Dao |
| 8,322,941 | B2 | 12/2012 | Cermak |
| 8,342,972 | B2 | 1/2013 | Yamazaki |
| 8,353,775 | B2 | 1/2013 | Kamikawa |
| 8,371,949 | B2 | 2/2013 | Patterson |
| 8,425,142 | B2 | 4/2013 | Disser |
| 8,435,125 | B2 | 5/2013 | Ooba |
| 8,469,829 | B2 | 6/2013 | Kobayashi |
| 8,475,286 | B2 | 7/2013 | Lamothe |
| 8,641,538 | B2 | 2/2014 | Oh |
| 8,740,713 | B2 * | 6/2014 | Deisinger ............. F16D 3/2055 464/175 |
| 8,834,279 | B2 | 9/2014 | Oh |
| 9,133,888 | B2 | 9/2015 | Gremmelmaier |
| 9,388,860 | B2 | 7/2016 | Berube |
| 9,670,963 | B2 | 6/2017 | Metzger |
| 9,850,960 | B2 * | 12/2017 | D'Angelo ............... F16D 3/845 |
| 2001/0016520 | A1 | 8/2001 | Sahashi |
| 2001/0046901 | A1 | 11/2001 | Meyer |
| 2003/0069075 | A1 | 4/2003 | Furuta |
| 2003/0083135 | A1 | 5/2003 | Yamazaki |
| 2003/0146591 | A1 | 8/2003 | Ouchi |
| 2005/0192107 | A1 | 9/2005 | Toriumi |
| 2007/0149298 | A1 | 6/2007 | Wormsbaecher |
| 2007/0225081 | A1 | 9/2007 | Toriumi |
| 2008/0234057 | A1 | 9/2008 | Takekawa |
| 2010/0124995 | A1 | 5/2010 | Disser |
| 2010/0249949 | A1 | 9/2010 | Bjarnason |
| 2010/0267455 | A1 | 10/2010 | Valovick |
| 2012/0004044 | A1 | 1/2012 | Conger |
| 2013/0244798 | A1 | 9/2013 | Oh |
| 2016/0017929 | A1 | 1/2016 | Sugiyama |
| 2017/0292570 | A1 | 10/2017 | Ketchel |

FOREIGN PATENT DOCUMENTS

| | | | |
|---|---|---|---|
| DE | 2703467 | | 8/1978 |
| DE | 2801114 | | 6/1979 |
| DE | 102010031841 | A1 | 3/2012 |
| EP | 2086180 | | 8/2009 |
| EP | 2123926 | | 11/2009 |
| EP | 2912329 | B1 | 12/2016 |
| FR | 2674299 | | 9/1992 |
| FR | 2899660 | | 10/2007 |
| GB | 503835 | | 4/1939 |
| GB | 2000573 | | 1/1979 |
| GB | 2017256 | A | 10/1979 |
| GB | 2323641 | | 9/1998 |
| JP | 2004232836 | | 8/2004 |
| NL | 301618 | A | 10/1965 |
| WO | 9306379 | | 4/1993 |
| WO | 2015077679 | | 5/2015 |
| WO | 2015153431 | | 10/2015 |

(56) References Cited

FOREIGN PATENT DOCUMENTS

| WO | 2017051746 | 3/2017 |
| WO | 2017196962 | 11/2017 |

OTHER PUBLICATIONS

European Patent Office, The International Search Report and Written Opinion issued in PCT/US2014/070499, dated Aug. 20, 2015, 10 pages, European Patent Office, Rijswijk, Netherlands.
European Patent Office, The International Search Report and Written Opinion issued in PCT/US2017/017377, dated May 9, 2017, 15 pages, European Patent Office, Rijswijk, Netherlands.
International Search Report and Written Opinion for Application No. PCT/US2015/023295, dated Oct. 15, 2015, issued by the European Patent Office. (12 pages).
The State Intellectual Property Office of the People's Republic of China, Chinese Office Action with Search Report for Application No. 201580025387.9, dated Jun. 28, 2018, 13 pages.
European Patent Office, International Search Report with Written Opinion issued in Application PCT/US2017/031933, dated Sep. 12, 2017, 11 pages, European Patent Office, Rijswijk, Netherlands.

* cited by examiner

BOOT ASSEMBLY FOR A CONSTANT VELOCITY JOINT

CROSS-REFERENCE TO RELATED APPLICATIONS

This application is the National Stage of International Application No. PCT/US2017/031933, filed May 10, 2017, which claims the benefit of U.S. Provisional Patent Application No. 62/345,225, filed on Jun. 3, 2016; U.S. Provisional Patent Application No. 62/412,385, filed on Oct. 25, 2016; and U.S. Provisional Patent Application No. 62/334,164, filed May 10, 2016, which are incorporated herein by reference in their entirety.

FIELD OF THE DISCLOSURE

The present disclosure relates to a boot assembly for use with a constant velocity joint assembly of a vehicle.

BACKGROUND OF THE DISCLOSURE

Constant velocity joints are widely used in motor vehicles and are commonly enclosed with a boot. The constant velocity joint boot is a well-known device that is used to enclose an end of the constant velocity joint to prevent the migration of dirt, debris and/or moisture into the joint while keeping lubricant within the joint. Boots can be made from flexible materials including plastic and elastomeric materials.

One specific type of constant velocity joint boot is a convoluted boot. The convolutions of the boot are axially spaced annular convolutions or folds that extend between two attachment portions used to attach the boot to two separate components of the constant velocity joint. Additionally, the convolutions allow the boot to flex when the constant velocity joint is articulated.

A conventional constant velocity joint includes an inner race, an outer race, a plurality of balls and a cage. The constant velocity joint boot can be connected to the outer race and a shaft that is connected to the inner race of the constant velocity joint.

When the constant velocity joint rotates at high speeds and experiences high temperature conditions, the boot can experience a circumferential load due to an increase in pressure within the joint. Additionally, the boot of the constant velocity joint experiences a circumferential load due to the movement and thermal expansion of a lubricating fluid contained within the joint. This circumferential load can cause the convolutions of the boot to become radially inverted causing an amount of unwanted deformation within the structure of the boot thereby decreasing the overall life and durability of the boot.

It would therefore be advantageous to develop a constant velocity joint boot that will inhibit the ability of the convolutions of the boot to radially invert when in operation thereby increasing the overall life and durability of the joint.

SUMMARY OF THE DISCLOSURE

The present disclosure relates to a joint assembly for a motor vehicle. The joint assembly includes an inner race, an outer race, one or more torque transfer elements and a cage that is interposed between the outer race and the inner race of the joint. An axially outermost end of the second end portion of the outer race has a stepped portion having a chamfer portion that circumferentially extends along at least a portion of an outer surface of the axially outermost end of the second end portion of the outer race.

The joint assembly further includes a flexible boot having an inner surface, an outer surface, a first end portion, a second end portion and an intermediate portion interposed between the first and second end portions of the flexible boot. At least a portion of an attachment portion of the first end portion of the flexible boot is connected to at least a portion of the outer surface of a second end portion of the outer race. A first shoulder portion connects the attachment portion of the first end portion of the flexible boot to a first valley of the intermediate portion of the flexible boot.

Integrally connected to at least a portion of the inner surface of the flexible boot is an adapter having a radially outboard end, a radially inboard end, a first side, a second side, a radially outboard portion and a radially inboard portion. Circumferentially extending from at least a portion of the first side of the radially outboard portion of the adapter is an outer race mating portion. The outer race mating portion of the adapter is of a size and a shape that is complementary to the stepped portion and the chamfer portion of the axially outermost end of the second end portion of the outer race.

Extending radially inboard from and adjacent to the outer race mating portion of the adapter is a substantially disc-shaped portion of the adapter. The first side of the substantially disc-shaped portion of the adapter has a shape that is complementary to and is in direct contact with the axially outermost end of the second end portion of the outer race. Additionally, the second side of the adapter has a shape that is complementary to the inner surface of the portion of the first shoulder portion of the flexible boot connecting the attachment portion to the first valley of the flexible boot. A t least a portion of the radially outboard end of the adapter and/or the second side of the adapter is integrally connected to at least a portion of the inner surface of said flexible boot.

BRIEF DESCRIPTION OF THE DRAWINGS

The above, as well as other advantages of the present disclosure, will become readily apparent to those skilled in the art from the following detailed description when considered in the light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the constant velocity joint boot assembly disclosed herein may be used in automotive, off-road vehicle, all-terrain vehicle, construction, structural, marine, aerospace, locomotive, military, machinery, robotic and/or consumer product applications. Additionally, as a non-limiting example, the constant velocity joint boot assembly disclosed herein may also be used in passenger vehicle, electric vehicle, hybrid vehicle, commercial vehicle, autonomous vehicles, semi-autonomous vehicles and/or heavy vehicle applications.

Figure 1:
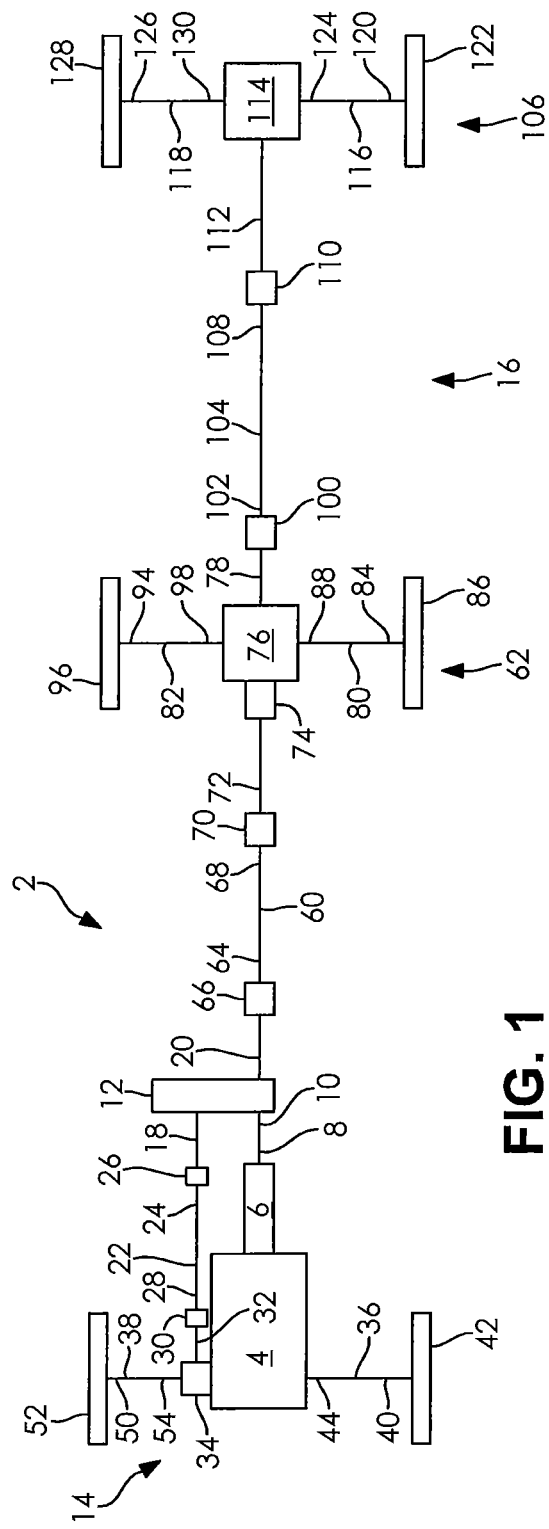
FIG. 1 is a schematic top-plan view of a vehicle having one or more constant velocity joint boot assemblies according to an embodiment of the disclosure.

FIG. 1 is a schematic top-plan view of a vehicle 2 having one or more constant velocity joint boot assemblies according to an embodiment of the disclosure. The vehicle 2 has an engine 4 which is drivingly connected to a transmission 6. As non-limiting example, the engine 4 of the vehicle 2 can be an internal combustion engine, an external combustion engine, an electric motor, a steam turbine and/or a gas turbine. A transmission output shaft 8 is then drivingly connected to an end of the transmission 6 opposite the engine 4. The transmission 6 is a power management system which provides controlled application of the rotational energy generated by the engine 4 by means of a gearbox.

The transmission output shaft 8 is drivingly connected to a transfer case input shaft 10 which in turn is drivingly connected to a transfer case 12. The transfer case 12 is used to selectively transfer the rotational power from the transmission 6 of the vehicle 2 to a front axle system 14 and a tandem axle system 16 by utilizing a series of gears and drive shafts. The transfer case 12 includes a first transfer case output shaft 18 and a second transfer case output shaft 20.

A first shaft 22 extends from the first transfer case output shaft 18 to the front axle system 14 thereby drivingly connecting the transfer case 12 to the front axle system 14 of the vehicle 2. In a non-limiting example, the first shaft 22 is a drive shaft, a prop shaft, a Cardan shaft, a double cardan shaft, a universal joint shaft or a universal coupling shaft. A first end portion 24 of the first shaft 22 is drivingly connected to an end of the first transfer case output shaft 18 opposite the transfer case 12 via a first, first shaft joint assembly 26. As illustrated in FIG. 1 of the disclosure, a second end 28 of the first shaft 22 is drivingly connected to a second, first shaft joint assembly 30.

Drivingly connected to an end of the second, first shaft joint assembly 30 opposite the first shaft 22 is a front axle input shaft 32. As a non-limiting example, the front axle input shaft 32 is a front differential input shaft, a coupling shaft, stub shaft or a front differential pinion shaft. Drivingly connected to an end of the front axle input shaft 32 opposite the first shaft 22 is a front axle differential 34. The front axle differential 34 is a set of gears that allows the outer drive wheel(s) of the wheeled vehicle 2 to rotate at a faster rate that the inner drive wheel(s). The rotational power is transmitted through the front axle system 14 as described in more detail below.

The front axle system 14 further includes a first front axle half shaft 36 and a second front axle half shaft 38. The first front axle half shaft 36 extends substantially perpendicular to the front axle input shaft 32. A first end portion 40 of the first front axle half shaft 36 is drivingly connected to a first front axle wheel assembly 42 and a second end portion 44 of the first front axle half shaft 36 is drivingly connected to a side of the front axle differential 34. As a non-limiting example, the second end portion 44 of the first front axle half shaft 36 is drivingly connected to a front differential side gear, a separate stub shaft, a separate coupling shaft, a first front axle differential output shaft, a first front axle half shaft disconnect system and/or a shaft that is formed as part of a front differential side gear.

Extending substantially perpendicular to the front axle system input shaft 32 is the second front axle half shaft 38. A first end portion 50 of the second front axle half shaft 38 is drivingly connected to a second front axle wheel assembly 52 and a second end portion 54 of the second front axle half shaft 38 is drivingly connected to a side of the front axle differential 34 opposite the first front axle half shaft 36. As a non-limiting example, the second end portion 54 of the second front axle half shaft 38 is drivingly connected to a front differential side gear, a separate stub shaft, a separate coupling shaft, a second front axle differential output shaft, a second front axle half shaft disconnect system and/or a shaft that is formed as part of a front differential side gear.

An end of the second transfer case output shaft 20 is drivingly connected to an end of the transfer case 12 opposite the transfer case input shaft 10. A second shaft 60 extends from the second transfer case output shaft 20 toward a forward tandem axle system 62 of the tandem axle system 16 of the vehicle 2. In a non-limiting example, the second shaft 60 is a drive shaft, a prop shaft, a Cardan shaft, a double cardan shaft, a universal joint shaft or a universal coupling shaft. A first end portion 64 of the second shaft 60 is drivingly connected to an end of the second transfer case output shaft 20 opposite the transfer case 12 via a first, second shaft joint assembly 66. As illustrated in FIG. 1 of the disclosure, a second end portion 68 of the second shaft 60 is drivingly connected to a second, second shaft joint assembly 70.

Drivingly connected to an end of the second, second shaft joint assembly 70 opposite the second shaft 60 is a forward tandem axle system input shaft 72. An end of the forward tandem axle system input shaft 72 opposite the second, second shaft joint assembly 70 is drivingly connected to an inter-axle differential 74 of the forward tandem axle system 62 of the vehicle 2. The inter-axle differential 74 is a device that divides the rotational power generated by the engine 4 between the axles of the tandem axle system 16 of the vehicle 2. As it can be by referencing FIG. 1 of the disclosure, the forward tandem axle system input shaft 72 drivingly connects the transfer case 12 to the inter-axle differential 74 of the forward tandem axle system 62 of the vehicle 2. In accordance with an embodiment of the disclosure and as a non-limiting example, the forward tandem axle system input shaft 72 is a drive shaft, a stub shaft, a coupling shaft, a forward tandem axle system input shaft, a pinion gear shaft or an inter-axle differential pinion gear shaft. The rotational power is transmitted through the forward tandem axle system 62 as described in more detail below.

As illustrated in FIG. 1 of the disclosure, the inter-axle differential 74 is drivingly connected to a forward tandem axle differential 76 and a forward tandem axle system output shaft 78. The forward tandem axle differential 76 is a set of gears that allows the outer drive wheel(s) of a wheeled vehicle 2 to rotate at a faster rate than the inner drive wheel(s).

The forward tandem axle system 62 further includes the use of a first forward tandem axle half shaft 80 and a second forward tandem axle half shaft 82. The first forward tandem axle half shaft 80 extends substantially perpendicular to the second shaft 60. A first end portion 84 of the first forward tandem axle half shaft 80 is drivingly connected to a first forward tandem axle wheel assembly 86 and a second end portion 88 of the first forward tandem axle half shaft 80 is drivingly connected to a side of the forward tandem axle differential 76. As a non-limiting example, the second end portion 88 of the first forward tandem axle half shaft 80 is drivingly connected to a forward tandem axle differential side gear, a separate stub shaft, a separate coupling shaft, a first forward tandem axle differential output shaft, a first forward tandem axle half shaft disconnect system and/or a shaft that is formed as part of a forward tandem axle differential side gear.

Extending substantially perpendicular with the second shaft 60 is the second forward tandem axle half shaft 82. A first end portion 94 of the second forward tandem axle half shaft 82 is drivingly connected to a second forward tandem axle wheel assembly 96. As illustrated in FIG. 1 of the disclosure, a second end portion 98 of the second forward tandem axle half shaft 82 is drivingly connected to a side of the forward tandem axle differential 76 opposite the first forward tandem axle half shaft 80. As a non-limiting example, the second end portion 98 of the second forward tandem axle half shaft 82 is drivingly connected to a forward tandem axle differential side gear, a separate stub shaft, a separate coupling shaft, a second forward tandem axle differential output shaft, a second forward tandem axle half shaft disconnect system and/or a shaft that is formed as part of a forward tandem axle differential side gear.

One end of the forward tandem axle system output shaft 78 is drivingly connected to a side of the inter-axle differential 74 opposite the second shaft 60. Drivingly connected to an end of the forward tandem axle system output shaft 78 opposite the inter-axle differential 74 is a first, third shaft joint assembly 100. An end of the first, third shaft joint assembly 100 opposite the forward tandem axle output shaft 78 is a first end portion 102 of a third shaft 104. The third shaft 104 extends from the forward tandem axle system 62 toward a rear tandem axle system 106 of the vehicle 2. As a non-limiting example, the third shaft 104 is a drive shaft, a prop shaft, a Cardan shaft, a double cardan shaft, a universal joint shaft or a universal coupling shaft. A second end portion 108 of the third shaft 104 is drivingly connected to a second, third shaft joint assembly 110.

Drivingly connected to an end of the second, third shaft coupling assembly 110 is a rear tandem axle system input shaft 112. An end of the rear tandem axle system input shaft 112 opposite the second, third shaft coupling assembly 110 is drivingly connected to a rear tandem axle differential 114 of the rear tandem axle system 106 of the vehicle 2. The rear tandem axle differential 114 is a set of gears that allows the outer drive wheel(s) of a wheeled vehicle 2 to rotate at a faster rate than the inner drive wheel(s). As it can be seen by referencing FIG. 1 of the disclosure, the rear tandem axle system input shaft 112 drivingly connects the inter-axle differential 74 to the rear tandem axle differential 114 of the rear tandem axle system 106 of the vehicle 2. The rotational power is transmitted through the rear tandem axle system 106 as described in more detail below.

The rear tandem axle system 106 further includes the use of a first rear tandem axle half shaft 116 and a second rear tandem axle half shaft 118. The first rear tandem axle half shaft 116 extends substantially perpendicular to the rear tandem axle system input shaft 112. A first end portion 120 of the first rear tandem axle half shaft 116 is drivingly connected to a first rear tandem axle wheel assembly 122 and a second end portion 124 of the first rear tandem axle half shaft 116 is drivingly connected to a side of the rear tandem axle differential 114. As a non-limiting example, the second end portion 124 of the first rear tandem axle half shaft 116 is drivingly connected to a rear tandem axle differential side gear, a separate stub shaft, a separate coupling shaft, a first rear tandem axle differential output shaft, a first rear tandem axle half shaft disconnect system and/or a shaft that is formed as part of a rear tandem axle differential side gear.

Extending substantially perpendicularly with the rear tandem axle system input shaft 112 is the second rear tandem axle half shaft 118. A first end portion 126 of the second rear tandem axle half shaft 118 is drivingly connected to a second rear tandem axle wheel assembly 128. As illustrated in FIG. 1 of the disclosure, a second end portion 130 of the second rear tandem axle half shaft 118 is drivingly connected to a side of the rear tandem axle differential 114 opposite the first rear tandem axle half shaft 116. As a non-limiting example, the second end portion 130 of the second rear tandem axle half shaft 118 is drivingly connected to a rear tandem axle differential side gear, a separate stub shaft, a separate coupling shaft, a second rear tandem axle differential output shaft, a second rear tandem axle half shaft disconnect system and/or a shaft that is formed as part of a rear tandem axle differential side gear.

According to an embodiment of the disclosure and as a non-limiting example, the joint assemblies 26, 66 and/or 100 of the vehicle 2 may be a universal coupling, a U-joint, a cardan joint, a double cardan joint, a Spicer joint, a Hardy Spicer Joint or a Hooke's joint. Additionally, according to an embodiment of the disclosure and as a non-limiting example, the joint assemblies 30, 70 and/or 110 of the vehicle 2 are a direct pinion mount constant velocity joint, a fixed direct pinion mount sliding ball type constant velocity joint, a direct pinion mount plunging cross groove sliding ball type constant velocity joint, a direct pinion mount double offset plunging constant velocity joint or a direct pinion mount tripod type constant velocity joint. It is within the scope of this disclosure that the joint assemblies 30, 70 and/or 110 of the vehicle 2 may include a boot assembly according to an embodiment of the disclosure.

Figure 2:
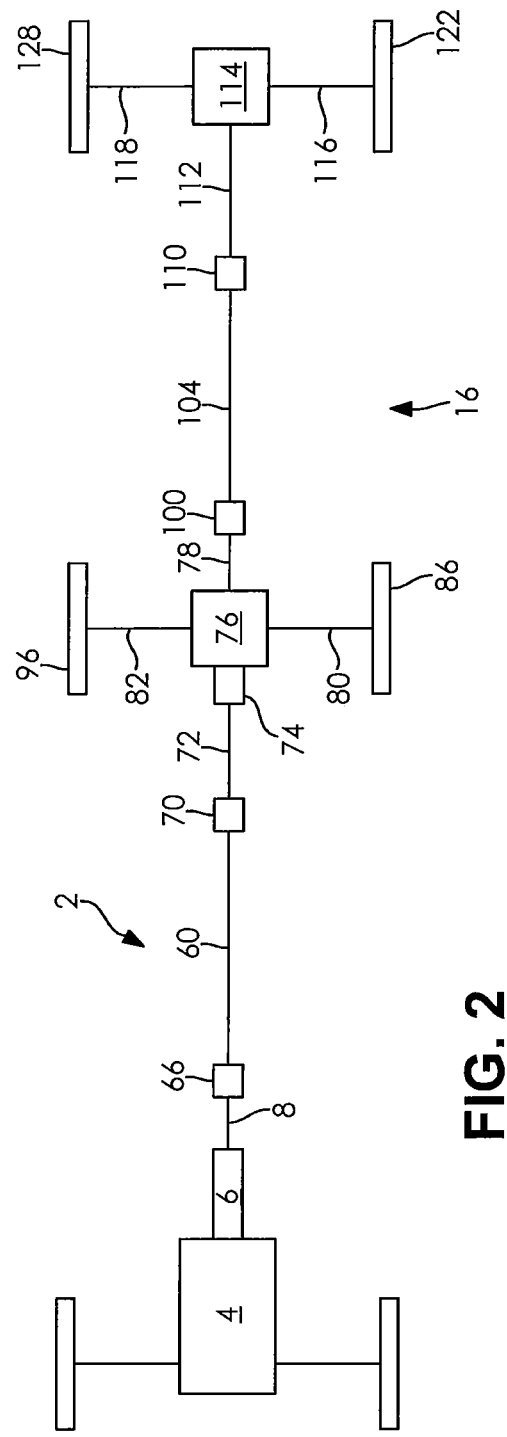
FIG. 2 is a schematic top-plan view of the vehicle illustrated in FIG. 1 according to an alternative embodiment of the disclosure where the vehicle has one or more constant velocity joint boot assemblies according to an embodiment of the disclosure.

FIG. 2 is a schematic top-plan view of the vehicle 2 illustrated in FIG. 1 according to an alternative embodiment of the disclosure. The vehicle 2 illustrated in FIG. 2 of the disclosure is the same as the vehicle 2 illustrated in FIG. 1, except where specifically noted below. As illustrated in FIG. 2 of the disclosure, the vehicle 2 does not include the transfer case 12. As a result, an end of the transmission output shaft 8 opposite the transmission 6 is drivingly connected to the end of the first, second shaft joint assembly 66 opposite the second shaft 60.

Figure 3:
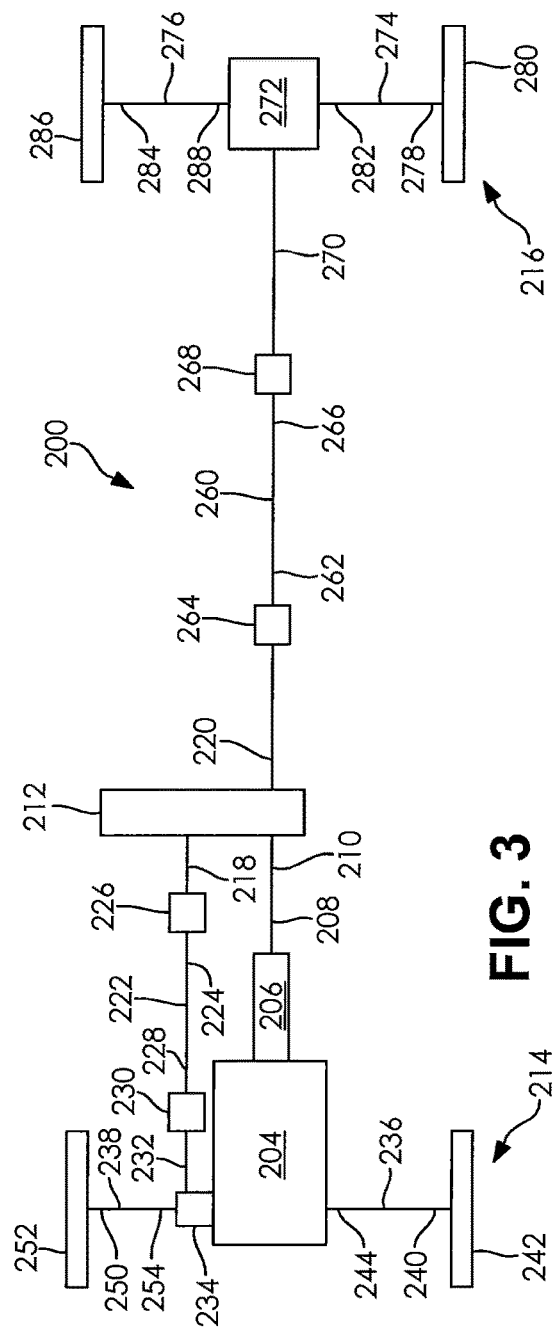
FIG. 3 is a schematic top-plan view of another vehicle having one or more constant velocity joint boot assemblies according to an embodiment of the disclosure.

FIG. 3 is a schematic top-plan view of another vehicle 200 having one or more constant velocity joint boot assemblies according to an embodiment of the disclosure. The vehicle 200 has an engine 204 which is drivingly connected to a transmission 206. As non-limiting example, the engine 204 of the vehicle 200 can be an internal combustion engine, an external combustion engine, an electric motor, a steam turbine and/or a gas turbine. A transmission output shaft 208 is then drivingly connected to an end of the transmission 206 opposite the engine 204. The transmission 206 is a power management system which provides controlled application of the rotational energy generated by the engine 204 by means of a gearbox.

The transmission output shaft 208 is drivingly connected to a transfer case input shaft 210 which in turn is drivingly connected to a transfer case 212. The transfer case 212 is used to selectively transfer the rotational power from the transmission 206 of the vehicle 200 to a front axle system 214 and a rear axle system 216 by utilizing a series of gears and drive shafts. The transfer case 212 includes a first transfer case output shaft 218 and a second transfer case output shaft 220.

A first shaft 222 extends from the first transfer case output shaft 218 to the front axle system 214 thereby drivingly connecting the transfer case 212 to the front axle system 214 of the vehicle 200. In a non-limiting example, the first shaft 222 is a drive shaft, a prop shaft, a Cardan shaft, a double cardan shaft, a universal joint shaft or a universal coupling shaft. A first end portion 224 of the first shaft 222 is drivingly connected to an end of the first transfer case output shaft 218 opposite the transfer case 212 via a first, first shaft joint assembly 226. As illustrated in FIG. 3 of the disclosure, a second end 228 of the first shaft 222 is drivingly connected to a second, first shaft joint assembly 230.

Drivingly connected to an end of the second, first shaft joint assembly 230 opposite the first shaft 222 is a front axle input shaft 232. As a non-limiting example, the front axle input shaft 232 is a front differential input shaft, a coupling shaft, stub shaft or a front differential pinion shaft. Drivingly connected to an end of the front axle input shaft 232 opposite the first shaft 222 is a front axle differential 234. The front axle differential 234 is a set of gears that allows the outer drive wheel(s) of the wheeled vehicle 200 to rotate at a faster rate that the inner drive wheel(s). The rotational power is transmitted through the front axle system 214 as described in more detail below.

The front axle system 214 further includes a first front axle half shaft 236 and a second front axle half shaft 238. The first front axle half shaft 236 extends substantially perpendicular to the front axle input shaft 232. A first end portion 240 of the first front axle half shaft 236 is drivingly connected to a first front axle wheel assembly 242 and a second end portion 244 of the first front axle half shaft 236 is drivingly connected to a side of the front axle differential 234. As a non-limiting example, the second end portion 244 of the first front axle half shaft 236 is drivingly connected to a front differential side gear, a separate stub shaft, a separate coupling shaft, a first front axle differential output shaft, a first front axle half shaft disconnect system and/or a shaft that is formed as part of a front differential side gear.

Extending substantially perpendicular to the front axle system input shaft 232 is the second front axle half shaft 238. A first end portion 250 of the second front axle half shaft 238 is drivingly connected to a second front axle wheel assembly 252 and a second end portion 254 of the second front axle half shaft 238 is drivingly connected to a side of the front axle differential 234 opposite the first front axle half shaft 236. As a non-limiting example, the second end portion 254 of the second front axle half shaft 238 is drivingly connected to a front differential side gear, a separate stub shaft, a separate coupling shaft, a second front axle differential output shaft, a second front axle half shaft disconnect system and/or a shaft that is formed as part of a front differential side gear.

An end of the second transfer case output shaft 220 is drivingly connected to an end of the transfer case 212 opposite the transfer case input shaft 210. A second shaft 260 extends from the second transfer case output shaft 220 toward the rear axle system 216 of the vehicle 200. In a non-limiting example, the second shaft 260 is a drive shaft, a prop shaft, a Cardan shaft, a double cardan shaft, a universal joint shaft or a universal coupling shaft. A first end portion 262 of the second shaft 260 is drivingly connected to an end of the second transfer case output shaft 220 opposite the transfer case 212 via a first, second shaft joint assembly 264. As illustrated in FIG. 3 of the disclosure, a second end portion 266 of the second shaft 260 is drivingly connected to a second, second shaft joint assembly 268.

Drivingly connected to an end of the second, second shaft joint assembly 268 opposite the second shaft 260 is a rear axle system input shaft 270. An end of the rear axle system input shaft 270 opposite the second, second shaft joint assembly 268 is drivingly connected to a rear axle differential 272 of the rear axle system 216 of the vehicle 200. The rear axle differential 272 is a set of gears that allows the outer drive wheel(s) of a wheeled vehicle 200 to rotate at a faster rate than the inner drive wheel(s). As it can be by referencing FIG. 3 of the disclosure, the rear axle system input shaft 270 drivingly connects the transfer case 212 to the rear axle differential 272 of the rear axle system 216 of the vehicle 200. In accordance with an embodiment of the disclosure and as a non-limiting example, the rear axle system input shaft 270 is a drive shaft, a stub shaft, a coupling shaft, a rear axle system input shaft, a pinion gear shaft, a rear axle differential pinion gear shaft and/or a rear axle differential input shaft. The rotational power is transmitted through the rear tandem axle system 216 as described in more detail below.

The rear axle system 216 further includes the use of a first rear axle half shaft 274 and a second rear axle half shaft 276. The first rear axle half shaft 274 extends substantially perpendicular to the rear axle system input shaft 270. A first end portion 278 of the first rear axle half shaft 274 is drivingly connected to a first rear axle wheel assembly 280 and a second end portion 282 of the first rear axle half shaft 274 is drivingly connected to a side of the rear axle differential 272. As a non-limiting example, the second end portion 282 of the first rear axle half shaft 274 is drivingly connected to a rear axle differential side gear, a separate stub shaft, a separate coupling shaft, a first rear axle differential output shaft, a first rear axle half shaft disconnect system and/or a shaft that is formed as part of a rear axle differential side gear.

Extending substantially perpendicular with the rear axle system input shaft 270 is the second rear axle half shaft 276. A first end portion 284 of the second rear axle half shaft 276 is drivingly connected to a second rear axle wheel assembly 286. As illustrated in FIG. 3 of the disclosure, a second end portion 288 of the second rear axle half shaft 276 is drivingly connected to a side of the rear axle differential 272 opposite the first rear axle half shaft 274. As a non-limiting example, the second end portion 288 of the second rear axle half shaft 276 is drivingly connected to a rear axle differential side gear, a separate stub shaft, a separate coupling shaft, a second rear axle differential output shaft, a second rear axle half shaft disconnect system and/or a shaft that is formed as part of a rear axle differential side gear.

According to an embodiment of the disclosure and as a non-limiting example, the joint assemblies 226 and/or 264 of the vehicle 200 may be a universal coupling, a U-joint, a cardan joint, a double cardan joint, a Spicer joint, a Hardy Spicer Joint or a Hooke's joint. Additionally, according to an embodiment of the disclosure and as a non-limiting example, the joint assemblies 230 and/or 268 of the vehicle 200 are a direct pinion mount constant velocity joint, a fixed direct pinion mount sliding ball type constant velocity joint, a direct pinion mount plunging cross groove sliding ball type constant velocity joint, a direct pinion mount double offset plunging constant velocity joint or a direct pinion mount tripod type constant velocity joint. It is within the scope of this disclosure that the joint assemblies 230 and/or 268 of the vehicle 200 may include a boot assembly according to an embodiment of the disclosure.

Figure 4:
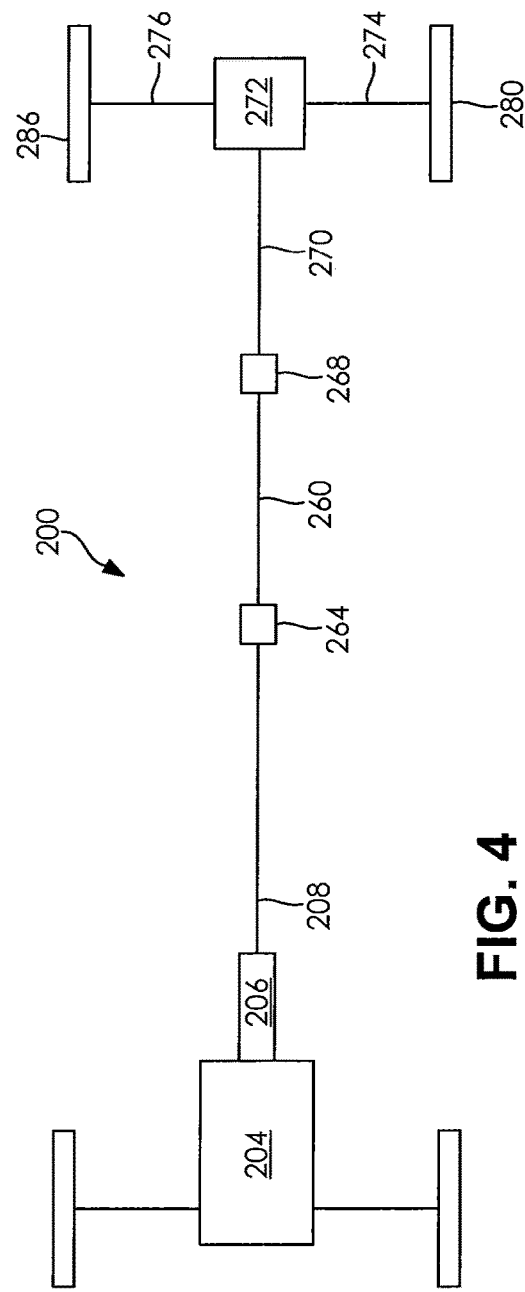
FIG. 4 is a schematic top-plan view of the vehicle illustrated in FIG. 3 according to an alternative embodiment of the disclosure where the vehicle has one or more constant velocity joint boot assemblies according to an embodiment of the disclosure.

FIG. 4 is a schematic top-plan view of the vehicle 200 illustrated in FIG. 3 according to an alternative embodiment of the disclosure. The vehicle 200 illustrated in FIG. 4 of the disclosure is the same as the vehicle 200 illustrated in FIG. 3, except where specifically noted below. As illustrated in FIG. 4 of the disclosure, the vehicle 200 does not include the transfer case 212. As a result, an end of the transmission output shaft 208 opposite the transmission 206 is drivingly connected to the end of the first, second shaft joint assembly 264 opposite the second shaft 260.

Figure 5:
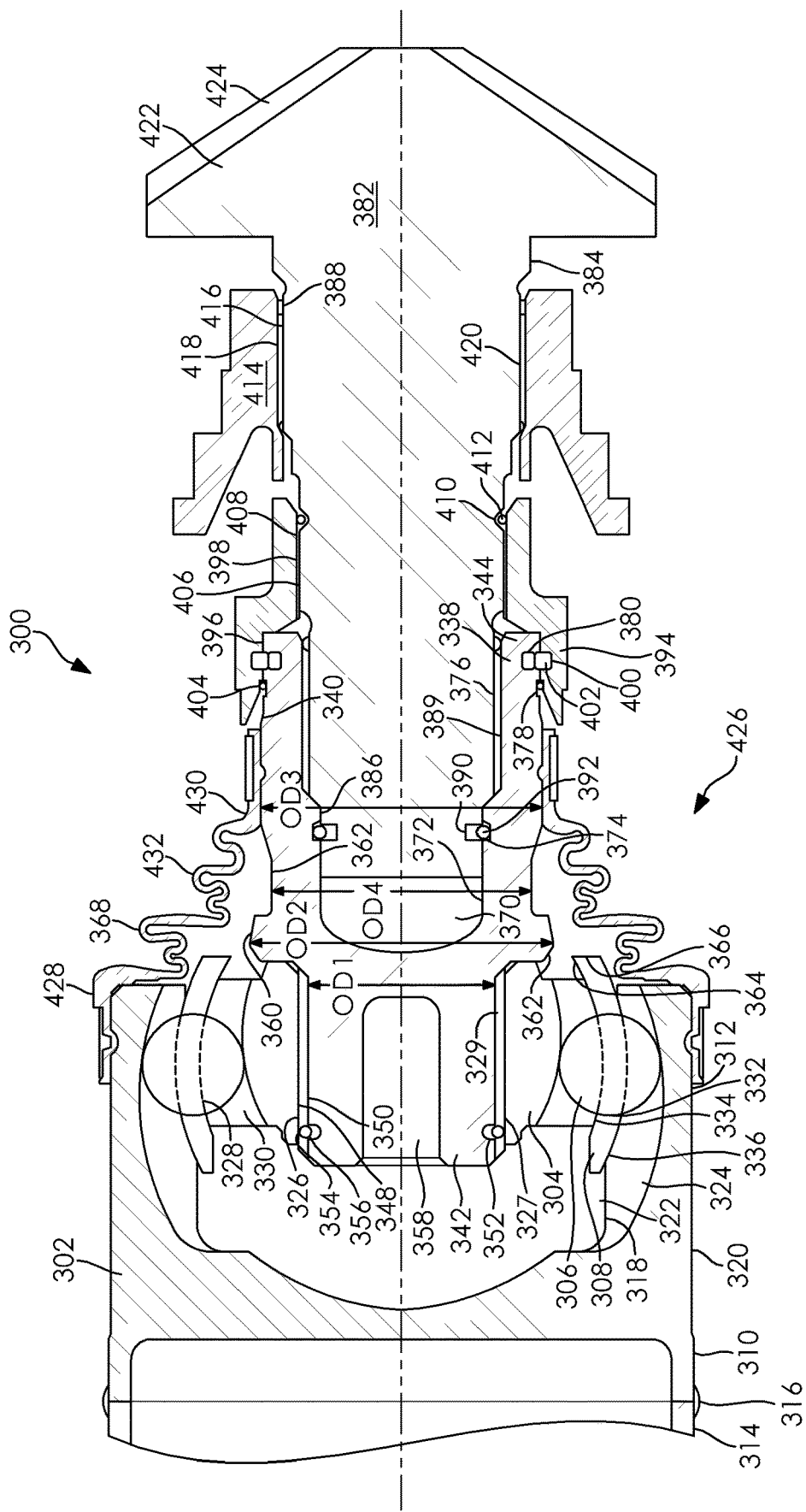
FIG. 5 is a cut-away schematic side-view of a joint assembly having a boot assembly according to an embodiment of the disclosure.
Figure 5A:
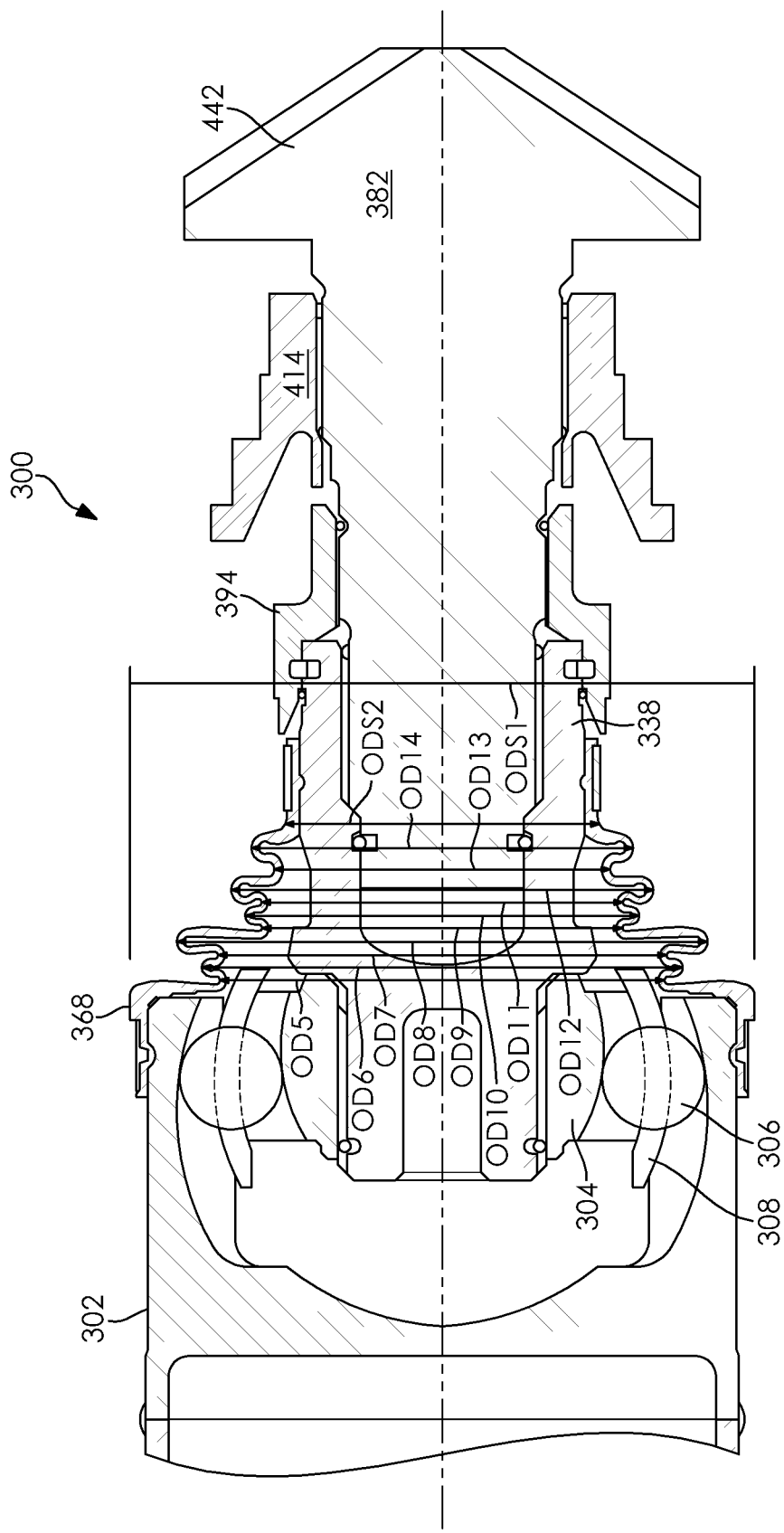
FIG. 5A is a cut-away schematic side-view of a portion of the boot assembly illustrated in FIG. 5 of the disclosure.
Figure 5B:
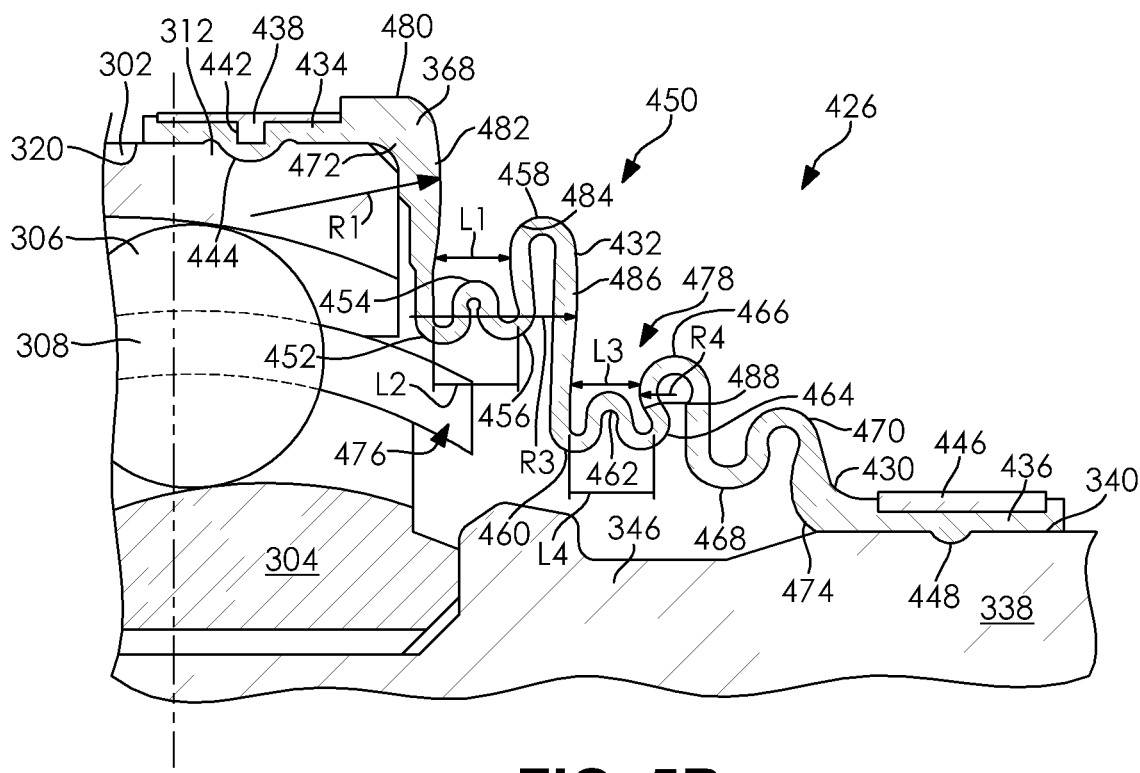
FIG. 5B is a cut-away schematic side-view of a portion of the boot assembly illustrated in FIGS. 5 and 5A of the disclosure.
Figure 5C:
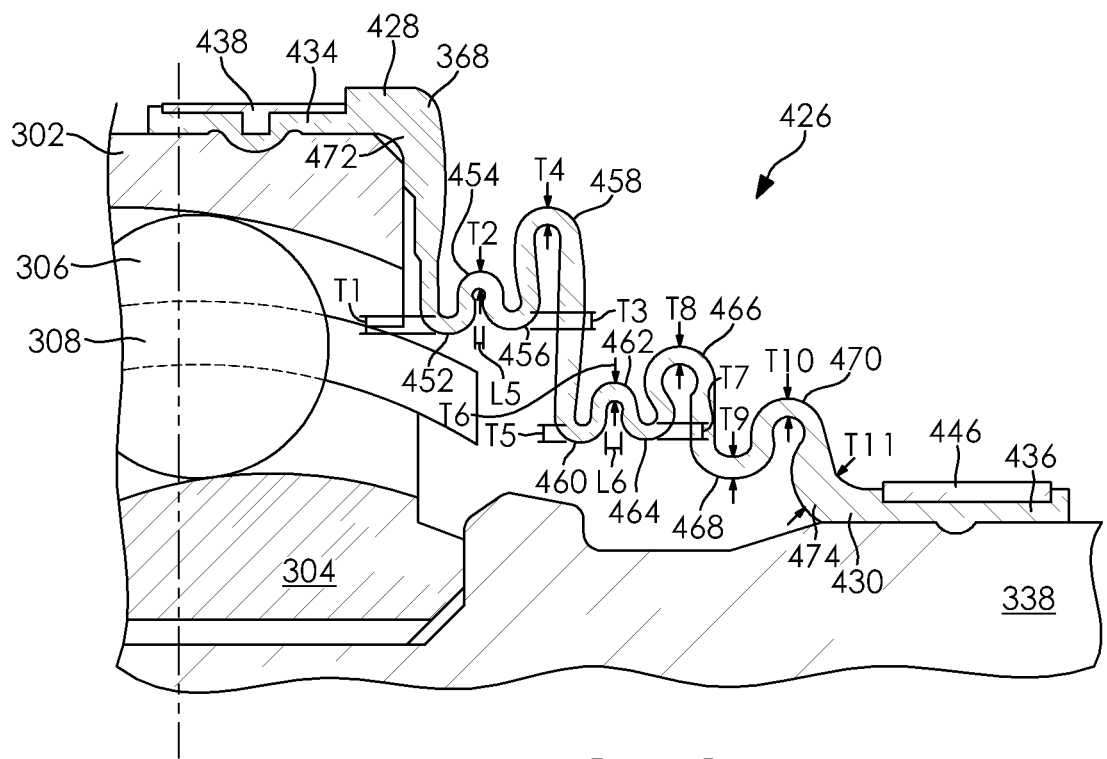
FIG. 5C is a cut-away schematic side-view of a portion of the boot assembly illustrated in FIGS. 5-5B of the disclosure.

FIGS. 5-5C is a cut-away schematic side-view of a joint assembly 300 according to an embodiment of the disclosure. As illustrated in FIGS. 5-5C of the disclosure, the joint assembly 300 has an outer race 302, an inner race 304, one or more torque transfer elements 306 and a cage 308 containing the one or more torque transfer elements 306. It is within the scope of this disclosure, that the outer race 302 of the joint assembly 300 is made of a rigid material, such as but not limited to, a steel composition. As a non-limiting example, the joint assembly 300 is a direct pinion mount constant velocity joint, a fixed direct pinion mount sliding ball type constant velocity joint, a direct pinion mount plunging cross groove sliding ball type constant velocity joint, a direct pinion mount double offset plunging constant velocity joint or a direct pinion mount tripod type constant velocity joint.

The outer race 302 of the joint assembly 300 has a first end portion 310 and a second end portion 312. At least a portion of the first end portion 310 of the outer race 302 of the joint assembly 300 is connected to a shaft 314. According to an embodiment of the disclosure and as a non-limiting example, at least a portion of the first end portion 310 of the outer race 302 is integrally connected to the shaft 314 by using one or more welds 316. In accordance with an alternative embodiment of the disclosure (not shown) and as a non-limiting example, at least a portion of the first end portion of the outer race is connected to the shaft by using one or more mechanical fasteners, one or more adhesives, a threaded connection and/or a splined connection. As a non-limiting example the shaft 314 is a drive shaft, a prop shaft, a Cardan shaft, a double cardan shaft, a universal joint shaft or a universal coupling shaft.

The second end portion 312 of the outer race 302 has an inner surface 318 and an outer surface 320 defining a hollow portion 322 therein. Circumferentially extending along at least a portion of the inner surface 318 of the second end portion 312 of the outer race 302 is one or more axially extending outer race torque transfer element grooves 324.

At least partially disposed within the hollow portion 322 of the second end portion 312 of the outer race 302 is the inner race 304 having an inner surface 326, an outer surface 328, a first end portion 327 and a second end portion 329. Circumferentially extending along at least a portion of the outer surface 328 of the inner race 304 is one or more axially extending inner race torque transfer element grooves 330. The one or more axially extending inner race torque transfer element grooves 330 are complementary to the one or more axially extending outer race torque transfer element grooves 324. As a non-limiting example, the inner race 304 of the joint assembly 300 is made of a rigid material, such as but not limited to, a steel composition.

In accordance with the embodiment of the disclosure illustrated in FIGS. 5-5C, at least a portion of the cage 308 is disposed between the inner surface 318 of the second end portion 312 of the outer race 302 and the outer surface 328 of the inner race 304 of the joint assembly 300. The cage 308 has one or more torque transfer element openings 332 extending from an inner surface 334 to an outer surface 336 of the cage 308. It is within the scope of this disclosure, that the cage 308 may be made of a rigid material, such as but not limited to, a steel composition.

The one or more torque transfer elements 306 drivingly connect the inner race 304 to the outer race 302 of the joint assembly 300. At least a portion of the one or more torque transfer elements 306 are disposed within the one or more axially extending outer race torque transfer element grooves 324, one or more axially extending inner race torque transfer element grooves 330 and the one or more torque transfer element openings 332 of the cage 308. In accordance with an embodiment of the disclosure and as a non-limiting example, the one or more torque transfer elements 306 are one or more ball bearings.

Drivingly connected to at least a portion of the inner surface 326 of the inner race 304 of the joint assembly 300 is a drive sleeve 338 having an outer surface 340, a first end portion 342, a second end portion 344 and an intermediate portion 346 interposed between the first and second end portions 342 and 344. The drive sleeve 338 extends co-axially with the inner race 304 of the joint assembly 300. Circumferentially extending along at least a portion of the outer surface 340 of the first end portion 342 of the drive sleeve 338 is a plurality of axially extending splines 348. As illustrated in FIGS. 5-5C of the disclosure, the plurality of axially extending splines 348 of the first end portion 342 of the drive sleeve 338 are complementary to and meshingly engaged with a plurality of axially extending splines 350 circumferentially extending from at least a portion of the inner surface 326 of the inner race 304. It is within the scope of this disclosure, that the drive sleeve 338 of the joint assembly 300 is made of rigid material, such as but not limited to, a steel composition.

Circumferentially extending along at least a portion of the outer surface 340 of the first end portion 342 of the drive sleeve 338 is a drive sleeve snap-ring groove 352. In accordance with an embodiment of the disclosure and as a non-limiting example, the drive sleeve snap-ring groove 352 is disposed within the plurality of axially extending splines 348 on the outer surface 340 of the first end portion 342 of the drive sleeve 338. As illustrated in FIGS. 5 and 5A of the disclosure, the drive sleeve snap-ring groove 352 is complementary to an inner race snap-ring groove 354 circumferentially extending along at least a portion of the inner surface 326 of the first end portion 327 of the inner race 304.

At least a portion of an inner race snap-ring 356 is disposed within the inner race snap-ring groove 354 and the drive sleeve snap-ring groove 352. The inner race snap-ring 356 axially retains the drive sleeve 338 to the inner race 304 thereby preventing the drive sleeve 338 from disengaging from driving engagement with the inner race 304 of the joint assembly 300.

According to an embodiment of the disclosure illustrated in FIGS. 5 and 5A and as a non-limiting example, the first end portion 342 of the drive sleeve 338 includes a hollow interior portion 358. In accordance with this embodiment of the disclosure and as a non-limiting example, the hollow interior portion 358 of the first end portion 342 of the drive sleeve 338 is substantially cylindrical in shape. The substantially hollow portion 358 of the first end portion 342 of the drive sleeve 338 reduces the overall weight and costs associated with the joint assembly 300.

Circumferentially extending along at least a portion of the outer surface 340 of the intermediate portion 346 of the drive sleeve 338 is an abutment portion 360. As best seen in FIG. 5 of the disclosure, the first end portion 342 of the drive sleeve 338 has an outer diameter OD1 that is less than an outer diameter OD2 of the abutment portion 360 of the sleeve 338. Additionally, as illustrated in FIG. 5 of the disclosure, the outer diameter OD2 of the abutment portion 360 is greater than an outermost diameter OD3 of the second end portion 344 of the drive sleeve 338. In accordance with the embodiment of the disclosure illustrated in FIG. 5 of the disclosure and as a non-limiting example, the abutment portion 360 is disposed adjacent to and is in direct contact with at least a portion of the second end portion 329 of the inner race 304 of the joint assembly 300. It is within the scope of this disclosure that the abutment portion 360 of the drive sleeve 338 is hardened and/or heat-treated to increase the overall life and durability of the drive sleeve 338. As a non-limiting example, the abutment portion 360 of the drive sleeve 338 is hardened and/or heat-treated by using one or more carburizing and/or induction hardening processes.

A stepped portion 362 is disposed axially outboard from and adjacent to the abutment portion 360 of the intermediate portion 346 of the drive sleeve 338 of the joint assembly 300. As illustrated in FIG. 5 of the disclosure, the stepped portion 362 of the drive sleeve 338 has an outer diameter OD4 that is less than the outer diameter OD2 of the abutment portion 360 of the drive sleeve 338. Additionally, as illustrated in FIG. 5 of the disclosure, the outer diameter OD4 of the stepped portion 362 of the drive sleeve 338 of the joint assembly 300 is less than the outer most diameter OD3 of the second end portion 344 of the drive sleeve 338. Furthermore, as illustrated in FIGS. 5-5C of the disclosure, the outer diameter OD4 of the stepped portion 362 of the drive sleeve 338 is greater than the outer diameter OD1 of the first end portion 342 of the drive sleeve 338. According to an embodiment of the disclosure and as a non-limiting example, the ratio between the outer diameter OD2 of the abutment portion 360 and the outer diameter OD4 of the steeped portion 362 of the drive sleeve 338 is approximately 1.1-1.3. Additionally, according to an embodiment of the disclosure and as a non-limiting example, the ratio between the outer diameter OD2 of the abutment portion 360 and the outermost diameter OD3 of the second end portion 344 of the drive sleeve 338 is approximately 1.03-1.20.

When the joint assembly 300 is articulated to the maximum joint angle (not shown), a contact surface 364 of the abutment portion 360 on the intermediate portion 346 of the drive sleeve 338 is in direct contact with at least a portion of the cage 308 of the joint assembly 300. In accordance with an embodiment of the disclosure, when the joint assembly 300 is articulated to the maximum joint angle (not shown), at least a portion of the contact surface 364 of the abutment portion 360 of the drive sleeve 338 will be in direct contact with an opening inner diameter 365 of an axially outermost edge 366 of the cage 308. As a result, the abutment portion 360 of the drive sleeve 338 acts as a stopper to prevent the joint assembly 300 from being articulated beyond the maximum joint angle (not shown), thereby preventing a flexible boot 368 of the joint assembly 300 from being over compressed. This will aid in increasing the overall life and durability of the flexible boot 368. Additionally, when the joint assembly 300 is articulated to the maximum joint angle (not shown), the stepped portion 362 provides the additional space necessary to ensure that the flexible boot 368 does not contact with the drive sleeve 338 thereby increasing the overall life and durability of the flexible boot 368.

The second end portion 344 of the drive sleeve 338 has a hollow interior portion 370. In accordance with an embodiment of the disclosure and as a non-limiting example, the hollow interior portion 370 of the second end portion 344 of the drive sleeve 338 is substantially cylindrical in shape. An inner surface 372 defining the hollow interior portion 370 of the second end portion 344 of the drive sleeve 338 has an interior portion snap-ring groove 374. The interior portion snap-ring groove 374 circumferentially extends along at least a portion of the inner surface 372 defining the hollow interior portion 370 of the second end portion 344 of the drive sleeve 338. Disposed axially outboard from the interior portion snap-ring groove 374, in the inner surface 372 defining the interior portion 370 of the second end portion 344 of the drive sleeve 338, is a plurality of axially extending circumferential splines 376.

As illustrated in FIGS. 5 and 5A of the disclosure, a drive sleeve O-ring groove 378 circumferentially extends along at least a portion of the outer surface 340 of the second end portion 344 of the drive sleeve 338. Circumferentially extending along at least a portion of the outer surface 340 of the second end portion 344 of the drive sleeve 338 is a drive sleeve snap-ring groove 380. In accordance with the embodiment of the disclosure illustrated in FIGS. 5 and 5A, the drive sleeve snap-ring groove 380 is disposed adjacent to and axially outboard from the drive sleeve O-ring groove 378.

Extending co-axially with the drive sleeve 338 and the inner race 304 of the joint assembly 300 is a pinion shaft 382 having an outer surface 384, a first end portion 386 and a second end portion 388. Circumferentially extending along at least a portion of the outer surface 384 of the first end portion 386 of the pinion shaft 382 is a first plurality of axially extending splines 389. The first plurality of axially extending splines 389 on the outer surface 384 of the first end portion 386 of the pinion shaft 382 are complementary to and meshingly engaged with the plurality of axially extending splines 376 on the inner surface 372 defining the hollow interior portion 370 of the second end portion 344 of the drive sleeve 338. The first plurality of axially extending splines 389 on the outer surface 384 of the first end portion 386 of the pinion shaft 382 drivingly connects the pinion shaft 382 to the drive sleeve 338 of the joint assembly 300. In accordance with an embodiment of the disclosure and as a non-limiting example, the pinion shaft 382 is made of a rigid material, such as but not limited to, a steel composition.

Disposed axially inboard from the first plurality of axially extending splines 389 on the outer surface 384 of the first end portion 386 of the pinion shaft 382 is a pinion shaft snap-ring groove 390. As illustrated in FIGS. 5 and 5A of the disclosure, the pinion shaft snap-ring groove 390 extends circumferentially along at least a portion of the outer surface 382 of the first end portion 386 of the pinion shaft 382. At least a portion of a pinion shaft snap-ring 392 is disposed within the pinion shaft snap-ring groove 390 of the pinion shaft 382 and the interior portion snap-ring groove 374 of the second end portion 344 of the drive sleeve 338. The pinion shaft snap-ring 392 axially retains the pinion shaft 382 to the drive sleeve 338 thereby preventing the pinion shaft 382 from disengaging from driving engagement with the drive sleeve 338 of the joint assembly 300.

As illustrated in FIGS. 5 and 5A of the disclosure, a nut 394 having a first inner surface 396 and a second inner surface 398 extends co-axially with the pinion shaft 382, the drive sleeve 338 and the inner race 304 of the joint assembly 300. At least a portion of the first inner surface 396 of the nut 394 radially overlaps the second end portion 344 of the drive sleeve 338. Circumferentially extending along at least a portion of the first inner surface 396 of the nut 394 is a nut snap-ring groove 400 that is complementary to the drive sleeve snap-ring groove 380 on the outer surface 340 of the second end portion 344 of the drive sleeve 338. At least a portion of a nut snap-ring 402 is disposed within the nut snap-ring groove 400 and the drive sleeve snap-ring groove 380 on the outer surface 340 of the second end portion 344 of the drive sleeve 338. The nut snap-ring 402 axially retains the nut 394 to the drive sleeve 338 thereby preventing the pinion shaft 382 from disengaging from driving engagement with the drive sleeve 338 of the joint assembly 300.

At least a portion of a nut O-ring 404 is disposed within the drive sleeve O-ring groove 378 in the outer surface 340 of the second end portion 344 of the drive sleeve 338. The nut O-ring creates a seal between the first inner surface 396 of the nut 394 and the outer surface 340 of the second end portion 344 of the drive sleeve 338. The nut O-ring 404 aids in preventing the migration of dirt, debris and/or moisture into the joint assembly 300 thereby improving the overall life and durability of the joint assembly 300.

Circumferentially extending along at least a portion of the second inner surface 398 of the nut 394 is a plurality of axially extending splines 406. The plurality of axially extending splines 406 on the second inner surface 398 of the nut 394 are complementary to and meshingly engaged with a second plurality of axially extending splines 408 on the outer surface 384 of the pinion shaft 382. As illustrated in FIGS. 5 and 5A of the disclosure, the second plurality of axially extending splines 408 are disposed axially outboard from and adjacent to the first plurality of axially extending splines 389 of the first end portion 386 of the pinion shaft 382.

Disposed axially outboard from and adjacent to the second plurality of axially extending splines 408 on the outer surface 384 of the pinion shaft 382 is a pinion shaft O-ring groove 410. At least a portion of a pinion shaft O-ring 412 is disposed within the pinion shaft O-ring groove 410. The pinion shaft O-ring provides a seal between the second inner surface 398 of the nut 394 and the outer surface 384 of the pinion shaft 382. As a result, the pinion shaft O-ring 412 aids in preventing the migration of dirt, debris and/or moisture into the joint assembly 300 thereby improving the overall life and durability of the joint assembly 300.

In accordance with the embodiment of the disclosure illustrated in FIGS. 5 and 5A, at least a portion of the nut 394 is disposed between the drive sleeve 338 and a lock nut 414. The lock nut 414 extends co-axially with the pinion shaft 382, the nut 394, the drive sleeve 338 and the inner race 304 of the joint assembly 300. The lock nut 414 axially retains the nut 394 to the drive sleeve 338 and the pinion shaft 382 thereby further aiding in preventing the pinion shaft 382 from disengaging from driving engagement with the drive sleeve 338. According to an embodiment of the disclosure and as a non-limiting example, the lock nut 414 is made of a rigid material, such as but not limited to, a steel composition.

As illustrated in FIGS. 5 and 5A of the disclosure, the lock nut 414 has a plurality of axially extending circumferential threads 416 extending from at least a portion of an inner surface 418 of the lock nut 414. The plurality of axially extending circumferential threads 416 on the inner surface 418 of the lock nut 414 are complementary to and meshingly engaged with a plurality of axially extending circumferential threads 420 extending along at least a portion of the outer surface 384 of the second end portion 388 of the pinion shaft 382. As illustrated in FIGS. 5 and 5A of the disclosure, the plurality of axially extending circumferential threads 420 are disposed axially outboard from the first and second plurality of axially extending splines 389 and 408 on the outer surface 384 of the pinion shaft 382.

At least a portion of the second end portion 388 of the pinion shaft 382 includes a pinion gear 422 having one or more gear teeth 424. The pinion gear 422 is disposed axially outboard from the first and second plurality of axially extending splines 389 and 408 and the plurality of axially extending circumferential threads 420 on the outer surface 384 of the pinion shaft 382. According to an embodiment of the disclosure, the pinion gear 422 is integrally formed as part of the second end portion 388 of the pinion shaft 382. In accordance with an alternative embodiment of the disclosure (not shown), at least a portion of the pinion gear is integrally connected to at least a portion of the second end portion 388 of the pinion shaft 382 by using one or more mechanical fasteners, one or more welds, one or more adhesives, a splines connection and/or a threaded connection.

The joint assembly 300 further includes a boot assembly 426. The boot assembly 426 includes a flexible boot 368 having a first end portion 428, a second end portion 430 and an intermediate portion 432 disposed between the first and second end portions 428 and 430 of the flexible boot 368. As illustrated in FIGS. 5-5C of the disclosure and as a non-limiting example, the flexible boot 368 is constructed of a single unitary piece. In accordance with an embodiment of the disclosure and as a non-limiting example, the flexible boot 368 is made of a thermoplastic material, a polymeric material, a rubber material and/or a similar elastomeric material. The thermoplastic materials are able to withstand the amount of heat and pressure generated by the joint assembly 300 during operation, as well as the various environmental conditions the flexible boot 368 is exposed to.

As best seen in FIG. 5B of the disclosure, the first end portion 428 of the flexible boot 368 has an attachment portion 434 and the second end portion 430 of the flexible boot 368 has an attachment portion 436. At least a portion of the attachment portion 434 of the first end portion 428 of the flexible boot 368 is connected to at least a portion of the outer surface 320 of the second end portion 312 of the outer race 302 of the joint assembly 300. Additionally, at least a portion of the attachment portion 436 of the second end portion 430 of the flexible boot 368 is connected to at least a portion of the outer surface 340 of the second end portion 344 of the drive sleeve 338 of the joint assembly 300. In accordance with an embodiment of the disclosure and as a non-limiting example, the attachment portions 434 and 436 of the first and second end portions 428 and 430 of the flexible boot 368 are substantially cylindrical in shape.

In order to secure the attachment portion 434 of the first end portion 428 of the flexible boot 368 to at least a portion of the outer surface 320 of the second end portion 312 of the outer race 302, one or more first clamping devices 438 are used. The one or more first clamping devices 438 are positioned radially around the attachment portion 434 of the first end portion 428 of the flexible boot 368. According to the embodiment of the disclosure illustrated in FIGS. 5-5C and as a non-limiting example, circumferentially extending from at least a portion of an inner surface 440 of the one or more first clamping devices 438 is a radially inward protruding portion 442. As a non-limiting example, when the one or more first clamping devices 438 are tightened, the radially inward protruding portion 442 forces at least a portion of the attachment portion 434 into a boot retention channel 444 in the outer surface 320 of the second end portion 312 of the outer race 302. This aids in securing and retaining the first end portion 428 of the flexible boot 368 on the second end portion 312 of the outer race 302. Additionally, this aids in ensuring that the attachment portion 434 of the first end portion 428 of the flexible boot 368 is sealingly engaged with the outer surface 320 of the second end portion 312 of the outer race 302 thereby preventing the migration of dirt, debris and/or moisture into the joint assembly 300. All of which aid in increasing the overall life and durability of the joint assembly 300.

In order to secure the attachment portion 436 of the second end portion 430 of the flexible boot 368 to the outer surface 340 of the drive sleeve 338, one or more second clamping devices 446 are used. The one or more second clamping devices 446 are positioned radially around the attachment portion 436 of the second end portion 430 of the flexible boot 368. As a non-limiting example, when the one or more second clamping devices 446 are tightened around the attachment portion 436 of the second end portion 430 of the flexible boot 368, it forces at least a portion of the attachment portion 436 into a boot retention channel 448 in the outer surface 340 of the second end portion 344 of the drive sleeve 338. This aids in securing and retaining the second end portion 430 of the flexible boot 368 on the drive sleeve 338. Additionally, this aids in ensuring that the attachment portion 436 of the second end portion 430 of the flexible boot 368 is sealingly engaged with the outer surface 340 of the drive sleeve 338 thereby preventing the migration of dirt, debris and/or moisture into the joint assembly 300. All of which aid in increasing the overall life and durability of the joint assembly 300.

As illustrated in FIGS. 5-5C of the disclosure, the intermediate portion 432 of the flexible boot 368 has a plurality of convolutions 450. In accordance with the embodiment of the disclosure illustrated in FIGS. 5-5C, the intermediate portion 432 of the flexible boot 368 includes, in axial order, a first valley 452, a first peak 454, a second valley 456, a second peak 458, a third valley 460, a third peak 462, a fourth valley 464, a fourth peak 466, a fifth valley 468 and a fifth peak 470. The valleys 452, 456, 460, 464 and 468 and the peaks 454, 458, 462, 466 and 470 are interposed between a first shoulder portion 472 of the first end portion 428 of the flexible boot 368 and a second shoulder portion 474 of the second end portion 430 of the flexible boot 368. As illustrated in FIGS. 5-5C of the disclosure, the first shoulder portion 472 connects the first valley 452 to the attachment portion 434 of the first end portion 428 of the flexible boot 368. Additionally, as illustrated in FIGS. 5-5C of the disclosure, the second shoulder portion 474 connects the fifth peak 470 to the attachment portion 436 of the second end portion 430 of the flexible boot 368.

According to an embodiment of the disclosure illustrated in FIGS. 5-5C, the peaks and valleys 452, 454, 456, 458, 460, 462, 464, 466, 468 and 470 of the intermediate portion 432 of the flexible boot 368 have an outer diameter OD5, OD6, OD7, OD8, OD9, OD10, OD11, OD12, OD13 and OD14 respectively. Additionally, in accordance with the embodiment of the disclosure illustrated in FIGS. 5-5C, the first shoulder portion 472 of the flexible boot 368 has an outer diameter ODS1 and the second shoulder portion 474 of the flexible boot 368 has an outer diameter ODS2. The outer diameter ODS1 of the first shoulder portion 472 of the flexible boot 368 is greater than the outer diameters OD5, OD6, OD7, OD8, OD9, OD10, OD11, OD12, OD13 and OD14 of the peaks and valleys 452, 454, 456, 458, 460, 462, 464, 466, 468 and 470 respectively of the intermediate portion 432 of the flexible boot 368. Additionally, the outer diameter ODS2 of the second shoulder portion 474 of the flexible boot 368 is less than the outer diameters OD5, OD6, OD7, OD8, OD9, OD10, OD11, OD12, OD13 and OD14 of the peaks and valleys 452, 454, 456, 458, 460, 462, 464, 466, 468 and 470 respectively of the intermediate portion 432 of the flexible boot 368.

In accordance with the embodiment of the disclosure illustrated in FIGS. 5-5C of the disclosure, the outer diameters OD5 and OD7 of the first and second valleys 452 and 456 are less than the outer diameters OD6 and OD8 of the first and second peaks 454 and 458 of the intermediate portion 432 of the flexible boot 368. Additionally, in accordance with the embodiment of the disclosure illustrated in FIGS. 5-5C, the outer diameter OD8 of the second peak 458 is greater than the outer diameter OD6 of the first peak 454. Furthermore, as a non-limiting example, the outer diameters OD5 and OD7 of the first and second valleys 452 and 454 are substantially the same. As a result, the first shoulder portion 472, the first valley 452, the first peak 454, the second valley 456 and the second peak 458 from a first substantially W-shaped portion 476 of the intermediate portion 432 of the flexible boot 368.

A second substantially W-shaped portion 478 of the intermediate portion 432 of the flexible boot 368 is disposed axially outboard from and adjacent to the first substantially W-shaped portion 476 of the intermediate portion 432 of the flexible boot 368. The second W-shaped portion 478 of the flexible boot 368 includes the second peak 458, the third valley 460, the third peak 462, the fourth valley 464 and the fourth peak 466. In accordance with the embodiment of the disclosure illustrated in FIGS. 5-5C, the outer diameter OD12 of the fourth peak 466 is less than the outer diameter OD8 of the second peak 458 but greater than the outer diameter OD10 of the third peak 462 of the intermediate portion 432 of the flexible boot 368. Additionally, according to the embodiment of the disclosure illustrated in FIGS. 5-5C, the outer diameters OD9 and OD11 of the third and fourth valleys 460 and 464 are less than the outer diameters OD8, OD10 and OD12 of the second, third and fourth peaks 458, 462 and 466 of the flexible boot 368. Furthermore, as illustrated in FIGS. 5-5C of the disclosure, the outer diameters OD10 and OD12 of the third and fourth peaks 462 and 466 are less than the outer diameters OD5 and OD7 of the first and second valleys 452 and 456 of the flexible boot 368. In accordance with an embodiment of the disclosure and as a non-limiting example, the outer diameters OD9 and OD11 of the third and fourth valleys 460 and 464 are substantially the same.

As illustrated in FIGS. 5-5C of the disclosure, the outer diameter OD14 of the fifth peak 470 is greater than the outer diameter OD13 of the fifth valley 468. Additionally as illustrated in FIGS. 5-5C of the disclosure, the outer diameter OD13 of the fifth valley 468 is less than the outer diameters OD9 and OD11 of the third and fourth valleys 460 and 464 of the flexible boot 368. Furthermore, the outer diameter OD14 of the fifth peak 470 is greater than the outer diameters OD9 and OD11 of the third and fourth valleys 460 and 464 but is less than the outer diameter OD10 of the third peak 462 of the intermediate portion 432 of the flexible boot 368.

The first substantially W-shaped portion 476 of the intermediate portion 432 of the flexible boot 368 has a linear axial distance L1 and a linear axial distance L2 measured along an outer surface 480 of the flexible boot 368 of the boot assembly 426. The linear axial distance L1 of the first substantially W-shaped portion 476 of the flexible boot 368 is defined as the innermost linear axial distance between the first shoulder portion 472 and the second peak 458 of the flexible boot 368. Furthermore, the linear axial distance L2 of the first substantially W-shaped portion 476 of the flexible boot 368 is defined as the outermost linear axial distance between the first valley 452 and the second valley 456 of the flexible boot 368. As illustrated in FIGS. 5-5C of the disclosure, the linear axial distance L1 of the first substantially W-shaped portion 476 is less than the linear axial distance L2 of the first substantially W-shaped portion 476 of the flexible boot 368. By making the linear axial distance L1 less than the linear axial distance L2, it aids in preventing the first peak 454 from opening up in the radial direction when the joint assembly 300 is articulated. This aids in preventing the radial inversion of the flexible boot 368 when in operation thereby improving the overall life and durability of the joint assembly 300.

As illustrated in FIGS. 5-5C of the disclosure, the second substantially W-shaped portion 478 of the flexible boot 368 has a linear axial distance L3 and a linear axial distance L4 that is measured along the outer surface 480 of the flexible boot 368. The linear axial distance L3 of the second substantially W-shaped portion 478 of the flexible boot 368 is defined as the innermost linear axial distance between the second peak 458 and the fourth peak 466 of the flexible boot 368. The linear axial distance L4 of the second substantially W-shaped portion 478 of the flexible boot 368 is defined as the outermost linear axial distance between the third valley 460 and the fourth valley 464 of the flexible boot 368. As illustrated in FIGS. 5-5C of the disclosure, the linear axial distance L3 of the second substantially W-shaped portion 478 is less than the linear axial distance L4 of the second substantially W-shaped portion 478 of the flexible boot 368. By making the linear axial distance L3 less than the linear axial distance L4, it aids in preventing the third peak 462 from opening up in the radial direction when the joint assembly 300 is articulated. This aids in preventing the radial inversion of the flexible boot 368 when in operation thereby improving the overall life and durability of the joint assembly 300.

In accordance with the embodiment of the disclosure illustrated in FIGS. 5-5C, the outer surface 480 of the flexible boot 368 connecting the first shoulder portion 472 to the first valley 452 has a first arcuate portion 482 having a radius of curvature R1. Additionally, the outer surface 480 of the flexible boot 368 connecting the second valley 456 to the second peak 458 has a second arcuate portion 484 having a radius of curvature R2. The radii of curvature R1 and R2 of the first and second arcuate portions 482 and 484 of the flexible boot 368 are substantially convex in shape and aid in resisting the movement of the first peak 454 in the radial direction. This aids in preventing the radial inversion of the flexible boot 368 when in operation thereby improving the overall life and durability of the joint assembly 300.

According to an the embodiment of the disclosure illustrated in FIGS. 5-5C, the outer surface 480 of the flexible boot 368 connecting the second peak 458 to the third valley 460 has a third arcuate portion 486 having a radius of curvature R3. Additionally, the outer surface 480 of the flexible boot 368 connecting the fourth valley 464 to the fourth peak 466 has a fourth arcuate portion 488 having a radius of curvature R4. The radii of curvature R3 and R4 of the third and fourth arcuate portions 486 and 488 of the flexible boot 368 are substantially convex in shape and aid in resisting the movement of the third peak 462 in the radial direction. This aids in preventing the radial inversion of the flexible boot 368 when in operation thereby improving the overall life and durability of the joint assembly 300.

As best seen in FIG. 5C of the disclosure, the valleys 452, 456, 460, 464 and 468 of the flexible boot 368 have a thickness T1, T3, T5, T7 and T9 respectively. Additionally, as illustrated in FIG. 5C of the disclosure, the peaks 454, 458, 462, 466 and 470 of the flexible boot 368 have a thickness T2, T4, T6, T8 and T10 respectively. According to an embodiment of the disclosure and as a non-limiting example, the thicknesses T2, T4, T6, T8 and T10 of the peaks 454, 458, 462, 466 and 470 of the flexible boot 368 is thinner than the thicknesses T1, T3, T5, T7 and T9 of the valleys 452, 456, 460, 464 and 468 of the flexible boot 368. As a non-limiting example, thickness of the valleys 452, 456, 460, 464 and 468 of the flexible boot 368 may be approximately 1.2 to 2.5 times the thickness of the peaks 454, 458, 462, 466 and 470 of the flexible boot 368. Additionally, as a non-limiting example, the thickness of the valleys 452, 456, 460, 464 and 468 of the flexible boot 368 may be approximately 1.2 mm to 2.5 mm. By making the peaks 454, 458, 462, 466 and 470 of the flexible boot 368 thinner than the valleys, 452, 456, 460, 464 and 468 of the flexible boot 368 aids in preventing the radial inversion of the flexible boot 368 when in operation. This aids in improving the overall life and durability of the joint assembly 300.

In accordance with an embodiment of the disclosure and as a limiting example, the thickness T9 of the fifth valley 468 is thicker than the thicknesses T1, T2, T3, T4, T5, T6, T7, T8 and T10 of the peaks and valleys 452, 454, 456, 458, 460, 462, 464, 466 and 470 but is thinner than a thickness T11 of the second shoulder portion 474 of the flexible boot 368. This further aids in preventing the radial inversion of the flexible boot 368 when in operation thereby improving the overall life and durability of the joint assembly 300.

As best seen in FIG. 5C of the disclosure, the flexible boot 368 further includes a linear axial distance L5 and L6 measured along an inner surface 490 of the flexible boot 368. The linear axial distance L5 is defined as the innermost linear axial distance between the first valley 452 and the second valley 456 of the flexible boot 368. The linear axial distance L6 is defined as the innermost linear axial distance between the third valley 460 and the fourth valley 464 of the flexible boot 368. In accordance with an embodiment of the disclosure and as a non-limiting example, the axial lengths L5 and L6 are substantially the same. As a non-limiting example, the axial lengths L5 and L6 of the flexible boot 368 are approximately 0 to 1 mm. By making the axial lengths L5 and L5 relatively small, it aids in preventing the radial inversion of the flexible boot 368 when in operation thereby improving the overall life and durability of the joint assembly 300.

Figure 6:
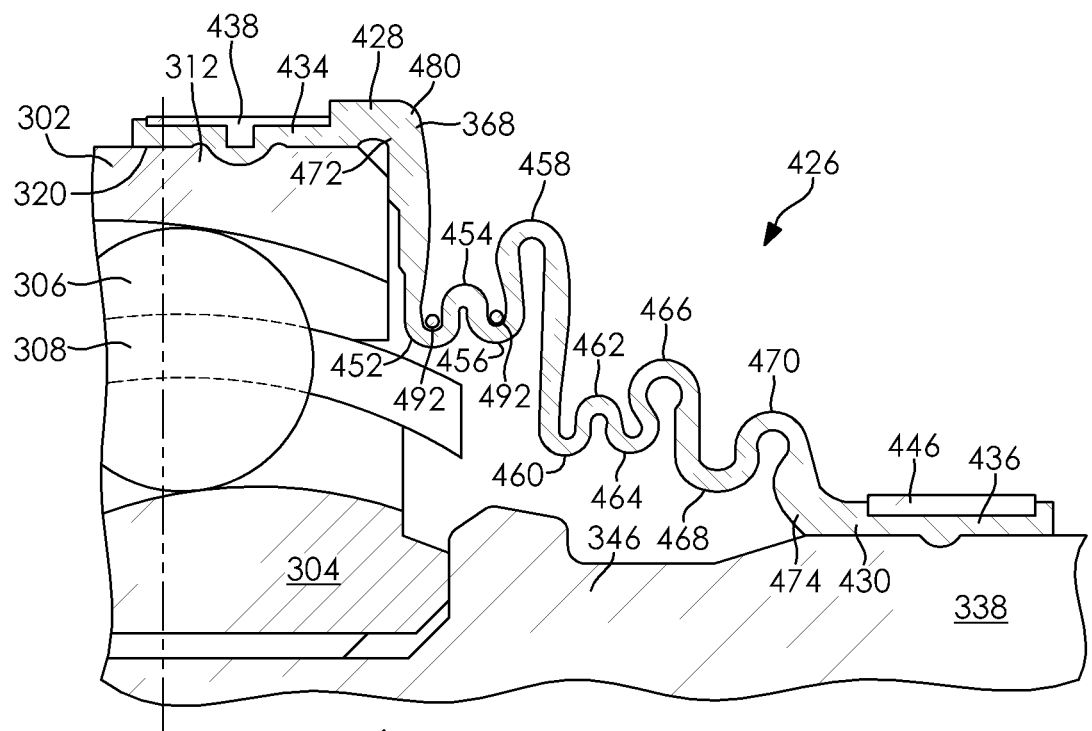
FIG. 6 is a cut-away schematic side-view of a portion of the boot assembly of the joint assembly illustrated in FIGS. 5-5C of the disclosure according to an alternative embodiment of the disclosure.

FIG. 6 is a cut-away schematic side-view of a portion of the boot assembly 426 of the joint assembly 300 illustrated in FIGS. 5-5C of the disclosure according to an alternative embodiment of the disclosure. The boot assembly 426 illustrated in FIG. 6 of the disclosure is the same as the boot assembly 426 illustrated in FIGS. 5-5C, except where specifically noted. As illustrated in FIG. 6 of the disclosure, the boot assembly 426 further includes one or more snap-rings 492 disposed within one or more of the valleys 452, 456, 460, 464 and 468 of the flexible boot 368. In accordance with the embodiment of the disclosure illustrated in FIG. 6 and as a non-limiting example, the flexible boot 368 has one or more snap-rings 492 disposed within the first valley 452 and the second valley 456 of the flexible boot 368. The one or more snap-rings 492 are used to radially retain the valleys 452, 456, 460, 464 and 468 of the flexible boot 368 thereby preventing the radial inversion of the flexible boot 368 when in operation and improving the overall life and durability of the joint assembly 300.

Figure 7:
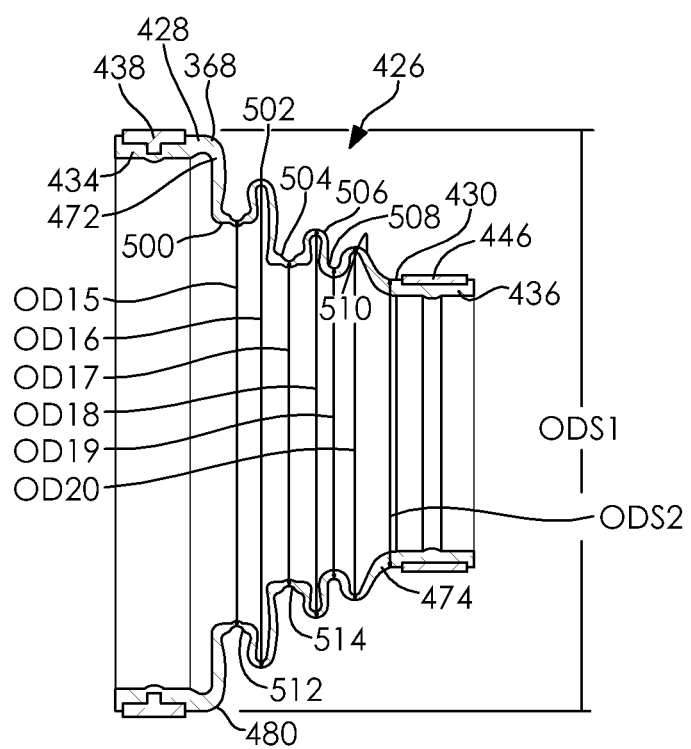
FIG. 7 is a cut-away schematic side-view of the boot assembly of the joint assembly illustrated in FIGS. 5-6 of the disclosure according to another embodiment of the disclosure.
Figure 7A:
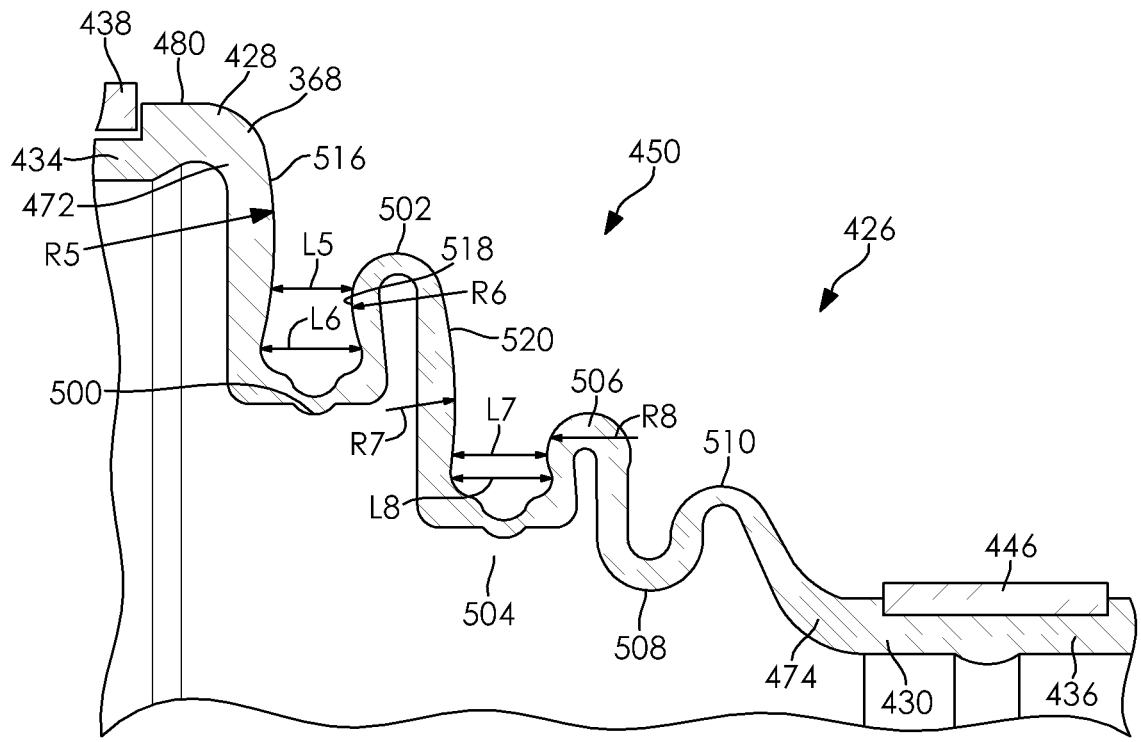
FIG. 7A is a cut-away schematic side-view of a portion of the boot assembly illustrated in FIG. 7 of the disclosure.
Figure 7B:
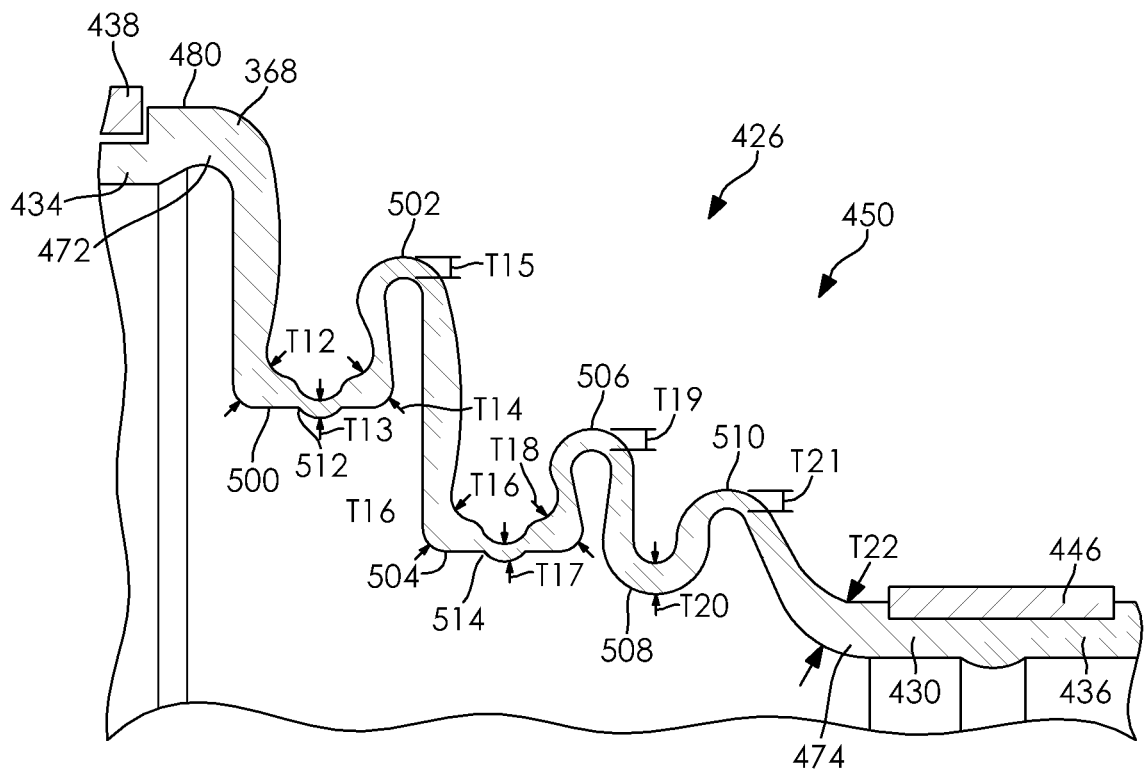
FIG. 7B is a cut-away schematic side-view of a portion of the boot assembly illustrated in FIGS. 7 and 7A of the disclosure.

FIGS. 7-7B are a cut-away schematic side-view of the boot assembly 426 of the joint assembly 300 illustrated in FIGS. 5-6 of the disclosure according to another embodiment of the disclosure. The boot assembly 426 illustrated in FIGS. 7-7B of the disclosure is the same as the boot assembly 426 illustrated in FIGS. 5-6, except where specifically noted. As illustrated in FIGS. 7-7B of the disclosure, the flexible boot 368 of the joint assembly 300 does not includes the first and second substantially W-shaped portions 476 and 478.

In accordance with the embodiment of the disclosure illustrated in FIGS. 7-7B, the flexible boot 368 includes, in axial order, a first valley 500, a first peak 502, a second valley 504, a second peak 506, a third valley 508 and a third peak 510. As illustrated in FIGS. 7-7B of the disclosure the first shoulder portion 472 connects the first valley 500 to the attachment portion 434 of the first end portion 428 of the flexible boot 368. Additionally, as illustrated in FIGS. 7-7B of the disclosure, the second shoulder portion 474 connects the third peak 510 to the attachment portion 436 of the second end portion 430 of the flexible boot 368.

The valleys 500, 405 and 508 of the flexible boot 368 have an outer diameter OD15, OD17 and OD19 respectively and the peaks 502, 506 and 510 of the flexible boot 368 have an outer diameter OD16, OD18 and OD20 respectively. As illustrated in FIGS. 7-7B and as a non-limiting example, the outer diameter ODS1 of the first shoulder portion 472 is greater than the outer diameters OD15, OD16, OD17, OD18, OD19 and OD20 of the peaks and valleys 500, 502, 504, 506, 508 and 510. Additionally, as illustrated in FIGS. 7-7B and as a non-limiting example, the outer diameter ODS2 of the second shoulder portion 474 is less than the outer diameters OD15, OD16, OD17, OD18, OD19 and OD20 of the peaks and valleys 500, 502, 504, 506, 508 and 510 of the flexible boot 368. In accordance with an embodiment of the disclosure and as a non-limiting example, the second valley 504 has an outer diameter OD17 that is less than the outer diameter OD15 of the first valley 500 but is greater than the outer diameter OD19 of the third valley OD19 of the flexible boot 368. Additionally, as a non-limiting example, the outer diameter OD18 of the second peak 506 is less than the outer diameter OD16 of the first peak 502 of the flexible boot 368 but is greater than the outer diameter OD20 of the third peak 510 of the flexible boot 368. Furthermore, in accordance with an embodiment of the disclosure and as a non-limiting example, the outer diameter OD18 of the second peak 506 is less than the outer diameter OD15 of the first valley 500 and the outer diameter OD20 of the third peak 510 is greater than the outer diameter OD17 of the second valley 504.

Circumferentially extending along at least a portion of the outer surface 480 of the first and second valleys 500 and 504 of the flexible boot 368 is a first snap-ring recess 512 and a second snap-ring recess 514 respectively. The first and second snap-ring recesses 512 and 514 of the flexible boot 368 are substantially concave in shape and extend radially inward from the outer surface 480 of the first and second valleys 500 and 504 of the flexible boot 368.

As best seen in FIG. 7A of the disclosure, the flexible boot 368 has a linear axial distance L5 along the outer surface 480 of the flexible boot 368 that is defined as the innermost linear axial distance between the first shoulder portion 472 and the first peak 502 of the flexible boot 368. Additionally, as illustrated in FIG. 7A of the disclosure, the flexible boot 368 has a linear axial distance L6 along the outer surface 480 of the flexible boot 368 that is defined as the outermost linear axial distance of the first valley 500 of the flexible boot 368. In accordance with an embodiment of the disclosure and as a non-limiting example, the linear axial distance L5 is less than the linear axial distance L6 of the flexible boot 368. By making the linear axial distance L5 less than the linear axial distance L6, it aids in preventing the first valley 500 from opening up in the radial direction when the joint assembly 300 is articulated. This aids in preventing the radial inversion of the flexible boot 368 when in operation thereby improving the overall life and durability of the joint assembly 300.

The flexible boot 368 illustrated in FIGS. 7-7B of the disclosure, has a linear axial distance L7 along the outer surface 480 of the flexible boot 368 that is defined as the innermost linear axial distance between the first peak 502 and the second peak 506 of the flexible boot 368. Additionally, as illustrated in FIGS. 7-7B, the flexible boot 368 has a linear axial distance L8 along the outer surface 480 of the flexible boot 368 that is defined as the outermost linear axial distance of the second valley 504 of the flexible boot 368. In accordance with an embodiment of the disclosure and as a non-limiting example, the linear axial distance L7 is less than the linear axial distance L8 of the flexible boot 368. By making the linear axial distance L7 less than the linear axial distance L8, it aids in preventing the second valley 504 from opening up in the radial direction when the joint assembly 300 is articulated. This aids in preventing the radial inversion of the flexible boot 368 when in operation thereby improving the overall life and durability of the joint assembly 300.

In accordance with the embodiment of the disclosure illustrated in FIGS. 7-7B, the outer surface 480 of the flexible boot 368 connecting the first shoulder portion 472 to the first valley 500 has an arcuate portion 516 having a radius of curvature R5. Additionally, the outer surface 480 of the flexible boot 368 connecting the first valley 500 to the first peak 502 has an arcuate portion 518 having a radius of curvature R6. The radii of curvature R5 and R6 of the flexible boot 368 illustrated in FIGS. 7-7B are substantially convex in shape and aid in resisting the movement of the movement of the first valley 500 in the radial direction. This aids in preventing the radial inversion of the flexible boot 368 when in operation thereby improving the overall life and durability of the joint assembly 300.

According to an the embodiment of the disclosure illustrated in FIGS. 7-7B, the outer surface 480 of the flexible boot 368 connecting the first peak 502 to the second valley 504 has an arcuate portion 520 having a radius of curvature R7. Additionally, the outer surface 480 of the flexible boot 368 connecting the second valley 504 to the second peak 506 has an arcuate portion 522 having a radius of curvature R8. The radii of curvature R7 and R8 of the flexible boot 368 illustrated in FIGS. 7-7B are substantially convex in shape and aid in resisting the movement of the second valley 504 in the radial direction. This aids in preventing the radial inversion of the flexible boot 368 when in operation thereby improving the overall life and durability of the joint assembly 300.

As best seen in FIG. 7B of the disclosure, the thickness of the flexible boot 368 varies throughout the plurality of convolutions 450. The first valley 500 of the flexible boot 368 has a thickness T12, T13 and T14 where the thicknesses T12 and T14 are disposed on opposite sides of the first snap-ring recess 512 of the first valley 500 of the flexible boot 368. Additionally, the first peak 502 has a thickness T15. In accordance with an embodiment of the disclosure and as a non-limiting example, the thickness T13 of the first snap-ring recess 512 of the first valley 500 is less than the thicknesses T12 and T14 of the first valley 500. Additionally, in accordance with an embodiment of the disclosure and as a non-limiting example, the thicknesses T12 and T14 of the first valley 500 are substantially equal. Furthermore, the thickness T15 of the first peak 502 is less than the thicknesses T12 and T14 of the first valley 500 of the flexible boot 368. By making the thicknesses T12 and T14 of the first valley 500 greater than the thickness T15 of the first peak 502, it aids in resisting the movement of the first valley 500 in the radial direction. This aids in preventing the radial inversion of the flexible boot 368 when in operation thereby improving the overall life and durability of the joint assembly 300.

The second valley 504 of the flexible boot 368 has a thickness T16, T17 and T18 where the thicknesses T16 and T18 are disposed on opposite sides of the second snap-ring recess 514 of the second valley 504 of the flexible boot 368. Additionally, the second peak 506 has a thickness T19. In accordance with an embodiment of the disclosure and as a non-limiting example, the thickness T17 of the second snap-ring recess 514 of the second valley 504 is less than the thicknesses T16 and T18 of the second valley 504. In accordance with an embodiment of the disclosure and as a non-limiting example, the thicknesses T16 and T18 of the second valley 504 are substantially equal. Additionally, as a non-limiting example, the thicknesses T15 and T19 of the first and second peaks 502 and 506 are substantially equal. Furthermore, as a non-limiting example, the thicknesses T13 and T17 of the first and second snap-ring recesses 512 and 514 of the first and second valleys 500 and 504 of the flexible boot 368 are substantially equal. In accordance with the embodiment of the disclosure illustrated in FIGS. 7-7B, the thicknesses T15 and T19 of the first and second peaks 502 and 506 are less than the thicknesses T16 and T18 of the second valley 504 of the flexible boot 368. By making the thicknesses T16 and T18 of the second valley 504 greater than the thicknesses T15 and T19 of the first and second peaks 502 and 506, it aids in resisting the movement of the second valley 504 in the radial direction. This aids in preventing the radial inversion of the flexible boot 368 when in operation thereby improving the overall life and durability of the joint assembly 300.

In accordance with the embodiment of the disclosure illustrated in FIG. 7B and as a non-limiting example, the third valley 508 has a thickness T20 and the third peak 510 has a thickness T21. As a non-limiting example, the thicknesses T15, T19 and T21 of the first, second and third peaks 502, 506 and 510 of the flexible boot 368 are substantially equal. Additionally, as a non-limiting example, the thickness T20 of the third valley 508 is greater than the thicknesses T12, T13 and T14 of the first valley 500, is greater than the thicknesses T16, T17 and T18 of the second valley 504 and is greater than the thicknesses T15, T19 and T21 of the first, second and third peaks 502, 506 and 510 of the flexible boot 368. By making the thickness T20 of the third valley 508 greater than the thicknesses T19 and T21 of the second and third peaks 506 and 510, it aids in resisting the movement of the third valley 508 in the radial direction. This aids in preventing the radial inversion of the flexible boot 368 when in operation thereby improving the overall life and durability of the joint assembly 300.

According to the embodiment of the disclosure illustrated in FIG. 7B and as a non-limiting example, the thickness T20 of the third valley 508 is less than the thickness T22 of the second shoulder portion 474 of the second end portion 436 of the flexible boot 368. By making the thickness T22 of the second shoulder portion 474 of the second end portion 436 of the flexible boot 368, it aids in preventing the radial inversion of the flexible boot 368 when in operation thereby improving the overall life and durability of the joint assembly 300.

Figure 8:
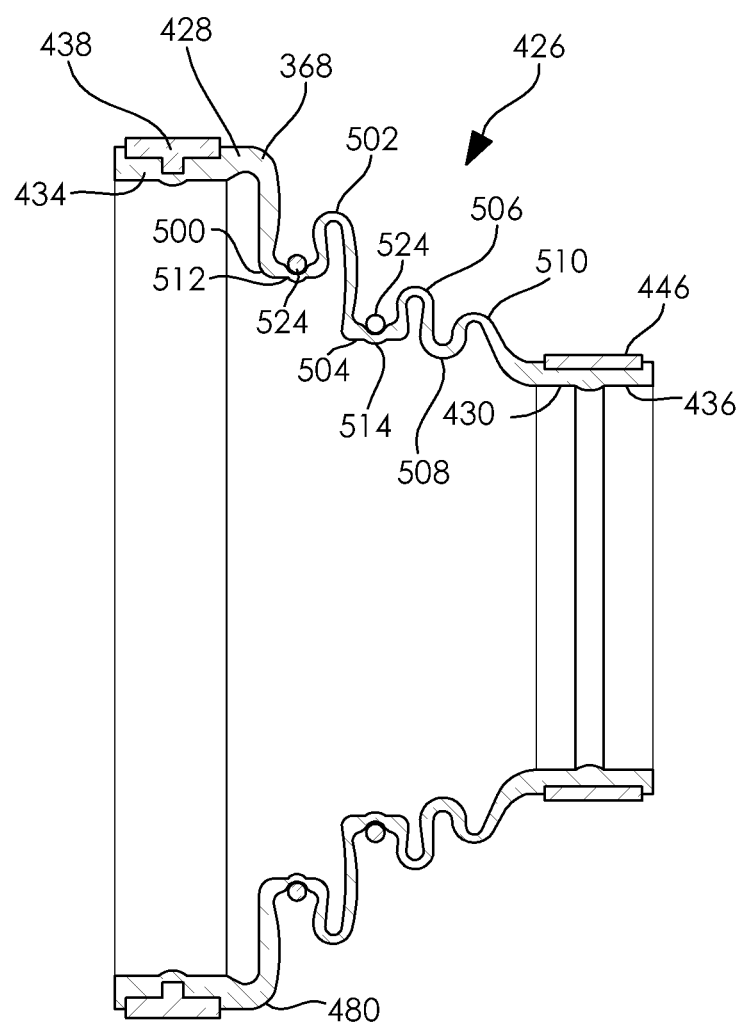
FIG. 8 is a cut-away schematic side-view of the boot assembly illustrated in FIGS. 7-7B of the disclosure according to an alternative embodiment of the disclosure.

FIG. 8 is a cut-away schematic side-view of the boot assembly 426 illustrated in FIGS. 7-7B of the disclosure according to an alternative embodiment of the disclosure. The boot assembly 426 illustrated in FIG. 8 of the disclosure is the same as the boot assembly 426 illustrated in FIGS. 7-7B, except where specifically noted. As illustrated in FIG. 8 of the disclosure, the boot assembly 426 further includes one or more snap-rings 524 disposed within one or more of the valleys 500, 504 and 508 of the flexible boot 368. In accordance with the embodiment of the disclosure illustrated in FIG. 8 and as a non-limiting example, the one or more snap-rings 524 are disposed within the first and second snap-ring recesses 512 and 514 of the first and second valleys 500 and 504 of the flexible boot 368. The one or more snap-rings 524 are used to radially retain the valleys 500, 504 and 508 of the flexible boot 368 thereby preventing the radial inversion of the flexible boot 368 when in operation and improving the overall life and durability of the joint assembly 300.

Figure 9:
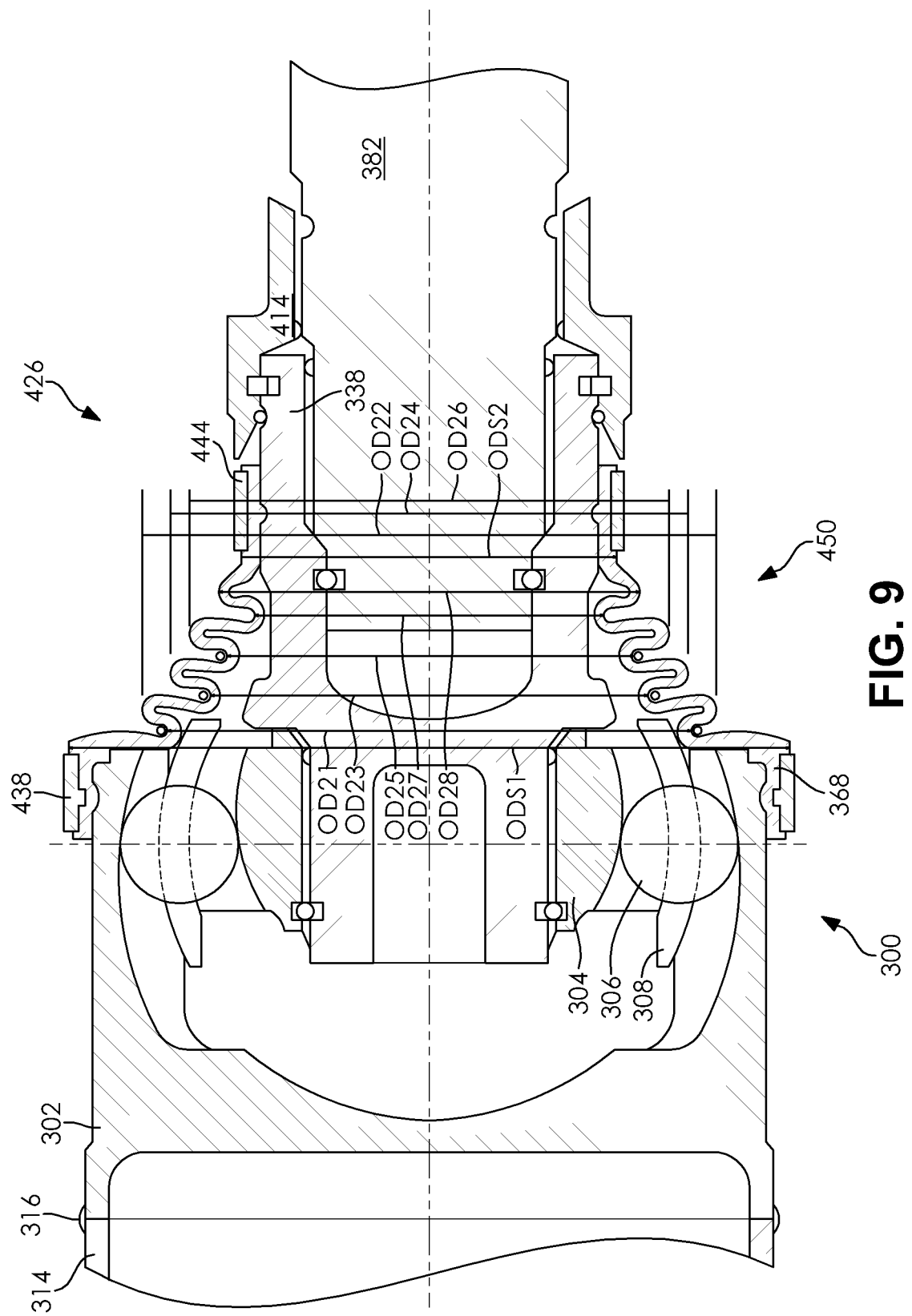
FIG. 9 is a cut-away schematic side-view of the joint assembly illustrated in FIGS. 5-6 having the boot assembly illustrated in FIGS. 5-8 according to yet another embodiment of the disclosure.
Figure 9A:
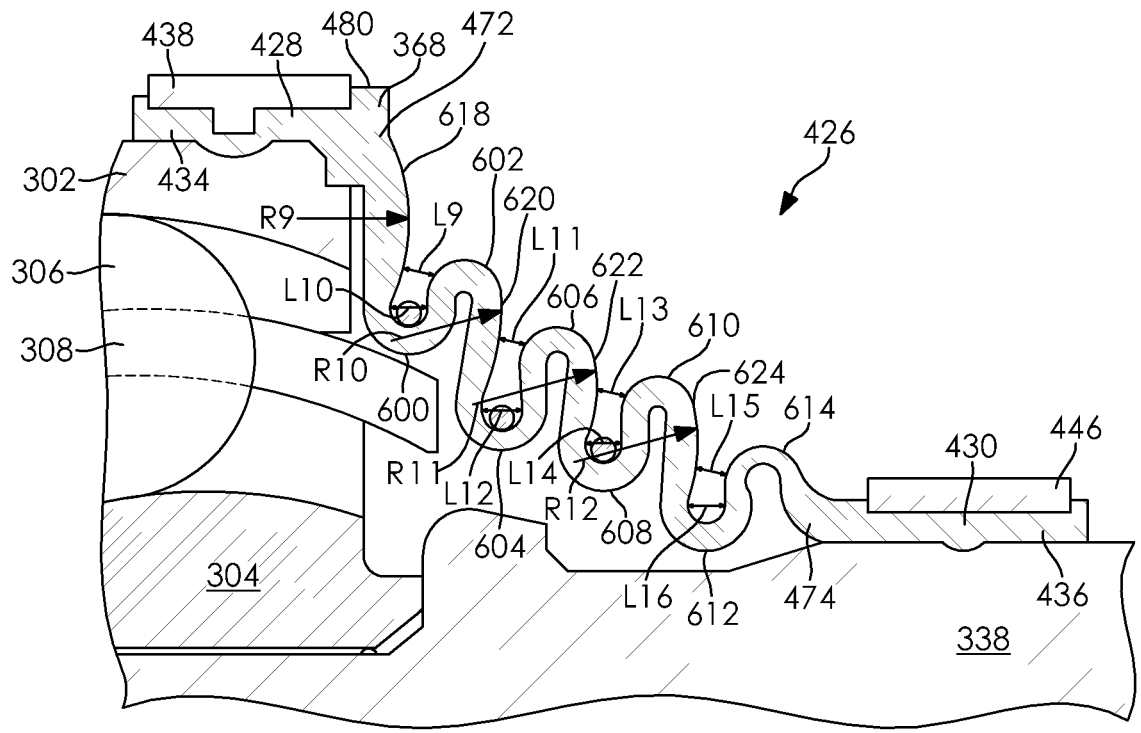
FIG. 9A is a cut-away schematic side-view of a portion of the boot assembly illustrated in FIG. 9 of the disclosure.
Figure 9B:
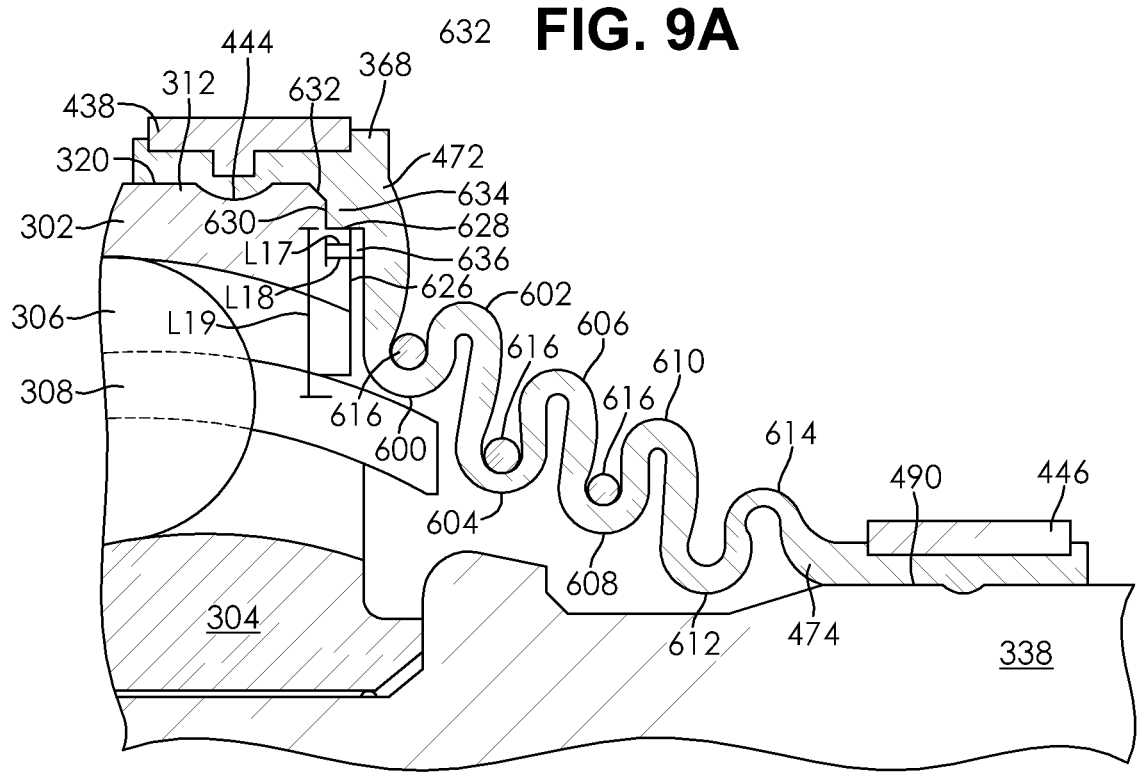
FIG. 9B is a cut-away schematic side-view of a portion of the boot assembly illustrated in FIGS. 9 and 9A of the disclosure.

FIGS. 9-9B are a cut-away schematic side-view of the joint assembly 300 illustrated in FIGS. 5-6 having the boot assembly 426 illustrated in FIGS. 5-8 according to yet another embodiment of the disclosure. The boot assembly 426 illustrated in FIGS. 9-9B of the disclosure is the same as the boot assembly 426 illustrated in FIGS. 5-7B, except where specifically noted. In accordance with the embodiment illustrated in FIGS. 9-9B the plurality of convolutions 450 of the intermediate portion 432 of the flexible boot 368 include, in axial order, a first valley 600, a first peak 602, a second valley 604, a second peak 606, a third valley 608, a third peak 610, a fourth valley 612 and a fourth peak 614. As illustrated in FIGS. 9-9B of the disclosure the first shoulder portion 472 connects the first valley 600 to the attachment portion 434 of the first end portion 428 of the flexible boot 368. Additionally, as illustrated in FIGS. 9-9B of the disclosure, the second shoulder portion 474 connects the fourth peak 614 to the attachment portion 436 of the second end portion 430 of the flexible boot 368.

The valleys 600, 604, 608 and 612 of the flexible boot 368 have an outer diameter OD21, OD23, OD25 and OD27 respectively and the peaks 602, 606, 610 and 614 of the flexible boot 368 have an outer diameter OD22, OD24, OD26 and OD28 respectively. As best seen in FIG. 9A of the disclosure and as a non-limiting example, the outer diameter ODS1 of the first shoulder portion 472 is greater than the outer diameters OD21, OD22, OD23, OD24, OD25, OD26, OD27 and OD28 of the peaks and valleys 600, 602, 604, 606, 608, 610, 612 and 614 of the flexible boot 368. Additionally, as illustrated in FIG. 9A and as a non-limiting example, the outer diameter ODS2 of the second shoulder portion 474 of the flexible boot 368 is less than the outer diameters OD21, OD22, OD23, OD24, OD25, OD26 and OD28 of the peaks and valleys 600, 602, 604, 606, 608, 610, and 614 but is greater than the outer diameter OD27 of the fourth valley 612. In accordance with the embodiment of the disclosure illustrated in FIG. 9A and as a non-limiting example, the outer diameter OD23 is less than the outer diameter OD21, the outer diameter OD25 is less than the outer diameter OD23 and the outer diameter OD27 is less than the outer diameter OD25 of the valleys 600, 604, 608 and 612. As a result, OD21>OD23>OD25>OD27. Additionally, as a non-limiting example, the outer diameter OD24 is less than the outer diameter OD22, the outer diameter OD26 is less than the outer diameter OD24 and the outer diameter OD28 is less than the outer diameter OD26 of the peaks 602, 606, 610 and 614. As a result, OD22>OD24>OD26>OD28.

The boot assembly 426 illustrated in FIGS. 9-9B of the disclosure, includes one or more snap-rings 616 disposed within one or more of the valleys 600, 604, 608 and 612 of the flexible boot 368. According to an embodiment of the disclosure and as a non-limiting example, the one or more snap-rings 616 are disposed within the first, second and third valleys 600, 604 and 608 of the flexible boot 368. The one or more snap-rings 616 are used to radially retain the valleys 600, 604 and 608 of the flexible boot 368 thereby preventing the radial inversion of the flexible boot 368 when in operation and improving the overall life and durability of the joint assembly 300.

As best seen in FIG. 9 of the disclosure, the outer surface 480 of the flexible boot 368 connecting the first shoulder portion 472 to the first valley 600 has an arcuate portion 618 having a radius of curvature R9. Additionally, the outer surface 480 of the flexible boot 368 connecting the first peak 602 to the second valley 604 has an arcuate portion 620 having a radius of curvature R10. Furthermore, the outer surface 480 of the flexible boot 368 connecting the second peak 606 to the third valley 608 has an arcuate portion 622 having a radius of curvature R11. Still further, as best seen in FIG. 9B of the disclosure, the outer surface 480 of the flexible boot 368 connecting the third peak 610 to the fourth valley 612 has an arcuate portion 624 having a radius of curvature R12. In accordance with an embodiment of the disclosure and as a non-limiting example, the radius of curvature R9 is greater than the radii of curvature R10, R11 and R12 of the flexible boot 368. As a non-limiting example, the radii of curvature R10, R11 and R12 of the flexible boot 368 are substantially equal. The radii of curvature R9, R10, R11 and R12 of the flexible boot 368 are substantially convex in shape and aid in resisting the movement of the first peak 454 in the radial direction. This aids in preventing the radial inversion of the flexible boot 368 when in operation thereby improving the overall life and durability of the joint assembly 300.

The flexible boot 368 has a linear axial distance L9 along the outer surface 480 that is defined as the innermost linear axial distance between the first shoulder portion 472 and the first peak 602 of the flexible boot 368. Additionally, as illustrated in FIG. 9A of the disclosure, the flexible boot 368 has a linear axial distance L10 along the outer surface 480 that is defined as the outermost linear axial distance of the first valley 600 of the flexible boot 368. In accordance with the embodiment of the disclosure illustrated in FIGS. 9-9B, the linear axial distance L10 of the flexible boot 368 is greater than the linear axial distance L9 of the flexible boot 368. By making the linear axial distance L9 less than the linear axial distance L10, it aids in preventing the first valley 600 from opening up in the radial direction when the joint assembly 300 is articulated. This aids in preventing the radial inversion of the flexible boot 368 when in operation thereby improving the overall life and durability of the joint assembly 300.

As illustrated in FIG. 9A of the disclosure, the flexible boot 368 has a linear axial distance L11 that is defined as the innermost linear axial distance between the first peak 602 and the second peak 606 of the flexible boot 368. Additionally, as illustrated in FIGS. 9-9B of the disclosure, the flexible boot 368 has a linear axial distance L12 along the outer surface 480 that is defined as the outermost linear axial distance of the second valley 604 of the flexible boot 368. In accordance with this embodiment of the disclosure and as a non-limiting example, the linear axial distance L12 of the flexible boot 368 is greater than the linear axial distance L11 of the flexible boot 368. By making the linear axial distance L11 less than the linear axial distance L12, it aids in preventing the second valley 604 from opening up in the radial direction when the joint assembly 300 is articulated. This aids in preventing the radial inversion of the flexible boot 368 when in operation thereby improving the overall life and durability of the joint assembly 300.

Additionally, the flexible boot 368 has a linear axial distance L13 that is defined as the innermost linear axial distance between the second peak 606 and the third peak 610 of the flexible boot 368. Furthermore, the flexible boot 368 has a linear axial distance L14 along the outer surface 480 that is defined as the outermost linear axial distance of the third valley 608 of the flexible boot 368. In accordance with this embodiment of the disclosure and as a non-limiting example, the linear axial distance L14 of the flexible boot 368 is greater than the linear axial distance L13 of the flexible boot 368. By making the linear axial distance L13 less than the linear axial distance L14, it aids in preventing the third valley 608 from opening up in the radial direction when the joint assembly 300 is articulated. This aids in preventing the radial inversion of the flexible boot 368 when in operation thereby improving the overall life and durability of the joint assembly 300.

As illustrated in FIGS. 9-9B of the disclosure, the flexible boot 368 has a linear axial distance L15 that is defined as the innermost linear axial distance between the third peak 610 and the fourth peak 614 of the flexible boot 368. Additionally, the flexible boot 368 has a linear axial distance L16 along the outer surface 480 that is defined as the outermost linear axial distance of the fourth valley 612 of the flexible boot 368. In accordance with this embodiment of the disclosure and as a non-limiting example, the linear axial distance L16 of the flexible boot 368 is greater than the linear axial distance L15 of the flexible boot 368. By making the linear axial distance L15 less than the linear axial distance L16, it aids in preventing the fourth valley 612 from opening up in the radial direction when the joint assembly 300 is articulated. This aids in preventing the radial inversion of the flexible boot 368 when in operation thereby improving the overall life and durability of the joint assembly 300.

In accordance with the embodiment of the disclosure illustrated in FIGS. 9-9B and as a non-limiting example, an axially outermost end 626 of the second end portion 312 of the outer race 302 has a stepped portion 628 having a substantially vertical wall portion 630 with a chamfer portion 632. The chamfer portion 632 provides a transitional edge connecting the outer surface 320 of the outer race 302 to the substantially vertical wall portion 630 of the stepped portion 628. As illustrated in FIGS. 9-9B, the stepped portion 628 and the chamfer portion 632 circumferentially extend along at least a portion of the outer surface 320 of the axially outermost end 626 of the second end portion 312 of the outer race 302. Additionally, as illustrated in FIGS. 9-9B of the disclosure, the stepped portion 628 has a diameter SPD that is less than an outer diameter ORD of the second end portion 312 of the outer race 302 of the joint assembly 300. The stepped portion 628 and the chamfer portion 632 of the axially outermost end 626 of the second end portion 312 of the outer race 302 provides a mating surface for the flexible boot 368 of the joint assembly 300.

Circumferentially extending along at least a portion of the inner surface 490 of the first shoulder portion 472 of the first end portion 430 of the flexible boot 368 is an outer race mating portion 634. As illustrated in FIGS. 9-9B, the outer race mating portion 634 of the first shoulder portion 472 of the flexible boot 368 has a shape that is complementary to and meshingly engaged with the stepped portion 628, the substantially vertical wall portion 630 and the chamfer portion 632 of the axially outermost end 626 of the second end portion 312 of the outer race 302. When the joint assembly 300 is articulated, at least a portion of the flexible boot 368 is compressed causing at least a portion of the outer race mating portion 634 of the flexible boot 368 to become frictionally engaged with at least a portion of the stepped portion 628 and/or the chamfer portion 632 of the outer race 302. This aids in preventing the radial inversion of the flexible boot 368 which increases the overall life and durability of the joint assembly 300.

In accordance with an embodiment of the disclosure and as a non-limiting example, the outer race 302 has a linear axial distance L17 that is smaller than a linear axial distance L18 of the outer race mating portion 634 of the flexible boot 368. The linear axial distance L17 is defined as the distance from the substantially vertical wall portion 630 to the axially outermost end 626 of the second end portion 312 of the outer race 302. The linear axial distance L18 is defined as the distance from the substantially vertical wall portion 630 of the stepped portion 628 of the outer race 302 to the inner surface 490 of the first shoulder portion 472 connecting the attachment portion 434 to the first valley 600 of the flexible boot 368. As a result, a gap 636 exists between the axially outermost end 626 of the second end portion 312 of the outer race 302 and the inner surface 490 of the flexible boot 368.

As illustrated in FIGS. 9-9B of the disclosure and as a non-limiting example, the inner surface 490 of the first shoulder portion 472 of the flexible boot 368 connecting the attachment portion 434 to the first valley 600 is substantially parallel to the axially outermost end 626 of the second end portion 312 of the outer race 302.

The flexible boot 368 has a linear radial distance L19 that is defined as the distance between the portion of the outer race mating portion 634 of the flexible boot 368 at the stepped portion 628 of the outer race 302 and the innermost point of the first valley 600 of the flexible boot 368. By reducing the linear radial distance L19 it aids in increasing the ability of the flexible boot 368 to resist radial inversion thereby increasing the overall life and durability of the joint assembly 300.

Figure 10:
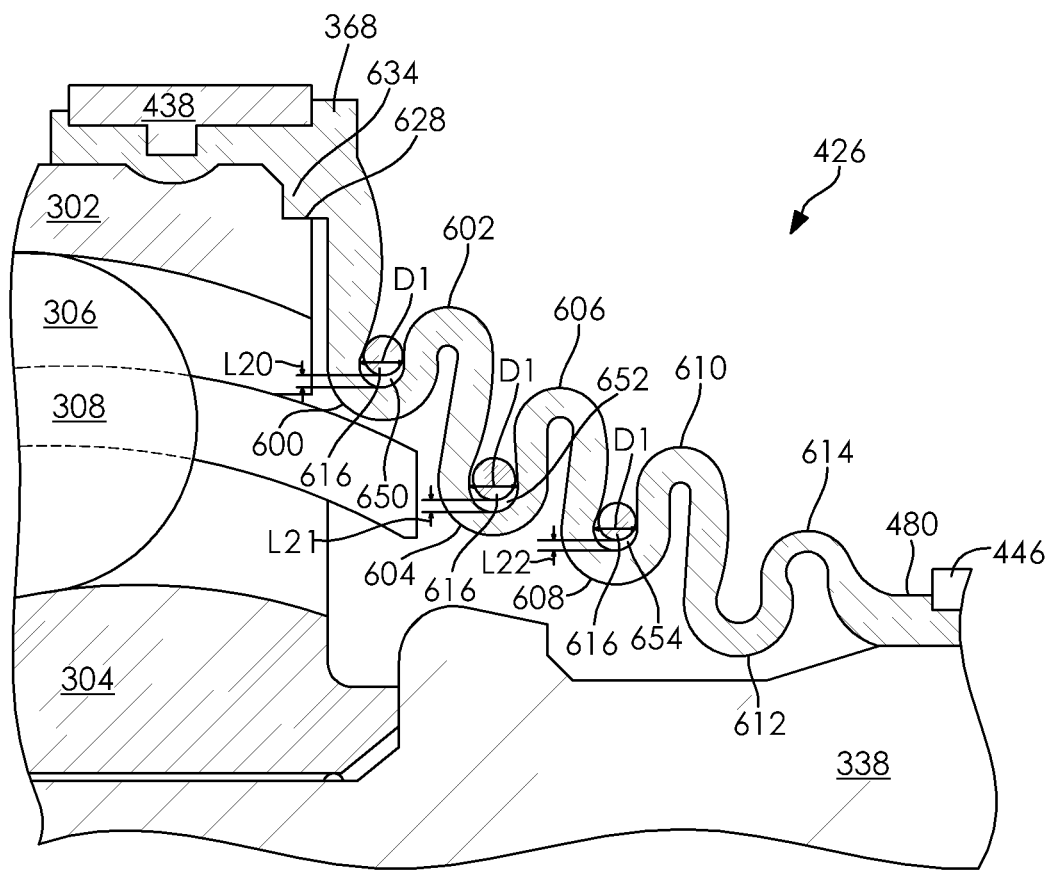
FIG. 10 is a cut-away schematic side-view of a portion of the boot assembly illustrated in FIGS. 9-9B according to a further embodiment of the disclosure.

FIG. 10 is a cut-away schematic side-view of a portion of the boot assembly 426 illustrated in FIGS. 9-9B according to a further embodiment of the disclosure. The boot assembly 426 illustrated in FIG. 10 is the same as the boot assembly 426 illustrated in FIGS. 9-9B, except where specifically noted. As illustrated in FIG. 10 of the disclosure, the one or more snap-rings 616 disposed within one or more of the valleys 600, 604, 608 and 612 of the flexible boot 368 have an innermost diameter that is greater than the outer diameters OD21, OD23, OD25 and OD27 of the valleys 600, 604, 608 and 612. As a result, a gap exists between the one or more snap-rings 616 and the outer surface 480 of the valleys 600, 604, 608 and 612 of the flexible boot 368.

According to the embodiment of the disclosure illustrated in FIG. 10 and as a non-limiting example, the one or more snap-rings 616 are disposed within the first, second and third valleys 600, 604 and 608 of the flexible boot 368. In accordance with this embodiment of the disclosure, there is a gap 650, 652 and 654 between the one or more snap-rings 616 and the outer surface 480 of the first, second and third valleys 600, 604 and 608 respectively. The gaps 650, 652 and 654 have a linear radial distance L20, L21 and L22 respectively that ranges from approximately 5% to 40% of the cross-sectional diameter D1 of the one or more snap-rings 616. The gaps 650, 652 and 654 allow the flexible boot 368 to expand radially outboard a pre-determined amount while still radially restricting the valleys 600, 604 and 608 and preventing one or more of the valleys 600, 604 and 608 from radially inverting. This aids in improving the overall life and durability of the joint assembly 300.

Figure 11:
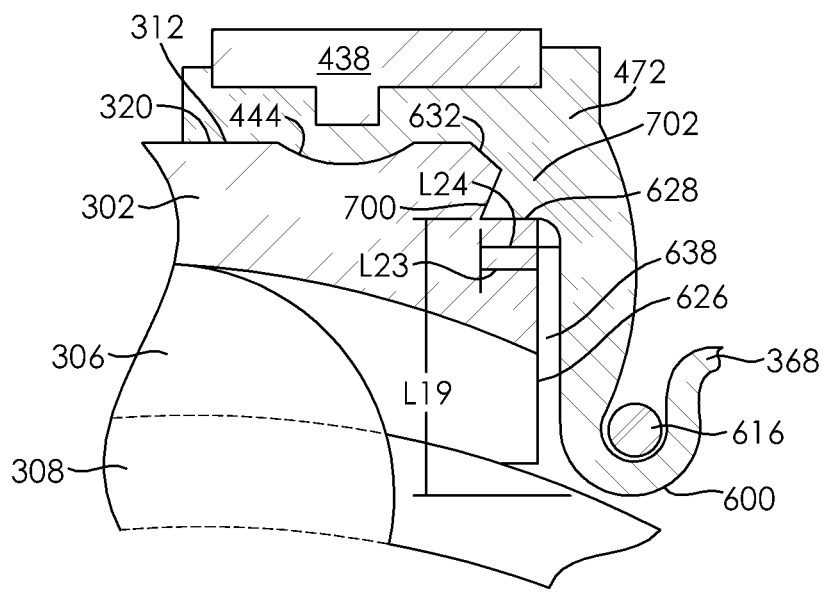
FIG. 11 is a cut-away schematic side-view of a portion of the boot assembly illustrated in FIGS. 9-10 according to still another embodiment of the disclosure.

FIG. 11 is a cut-away schematic side-view of a portion of the boot assembly 426 illustrated in FIGS. 9-10 according to still another embodiment of the disclosure. The boot assembly 426 illustrated in FIG. 11 is the same as the boot assembly 426 illustrated in FIGS. 9-10, except where specifically noted. As illustrated in FIG. 11 of the disclosure, the stepped portion 628 of the axially outermost end 626 of the second end portion 312 of the outer race 302 does not include the substantially vertical wall portion 630. In accordance with this embodiment of the disclosure, the stepped portion 628 of the outer race 302 has a back cut portion 700 in place of the substantially vertical wall portion 630.

Circumferentially extending along at least a portion of the inner surface 490 of the first shoulder portion 472 of the first end portion 430 of the flexible boot 368 is an outer race mating portion 702. As illustrated in FIG. 11, the outer race mating portion 702 of the first shoulder portion 472 of the flexible boot 368 has a shape that is complementary to and meshingly engaged with the stepped portion 628, the back cut portion 700 and the chamfer portion 632 of the axially outermost end 626 of the second end portion 312 of the outer race 302. In accordance with this embodiment of the disclosure, the outer race 302 has a linear axial distance L23 that is smaller than a linear axial distance L24 of the outer race mating portion 702 o the flexible boot 368. The linear axial distance L23 is defined as the distance from the axially outermost end 626 of the second end portion 312 of the outer race 302 to the point where the stepped portion 628 and the back cut portion 700 intersect. The linear distance L24 is defined as the distance from the inner surface 490 of the first shoulder portion 472 connecting the attachment portion 434 to the first valley 600 of the flexible boot 368 to the point where the stepped portion 628 and the back cut portion 700 intersect. In accordance with this embodiment of the disclosure, the linear axial distance L23 is greater than the linear axial distance L17 and the linear axial distance L24 is greater than the linear axle distance L18.

As illustrated in FIG. 11 of the disclosure and as a non-limiting example, the inner surface 490 of the first shoulder portion 472 of the flexible boot 368 connecting the attachment portion 434 to the first valley 600 is substantially parallel to the axially outermost end 626 of the second end portion 312 of the outer race 302.

When the joint assembly 300 is articulated, at least a portion of the flexible boot 368 is compressed causing at least a portion of the outer race mating portion 702 of the flexible boot 368 to become frictionally engaged with at least a portion of the stepped portion 628 and/or the chamfer portion 632 of the outer race 302. By increasing the linear axial distances L23 and L24, it increases the amount of surface area contact between the stepped portion 628 of the outer race 302 and the outer race mating portion 702 of the flexible boot 368. This increases the overall amount of frictional engagement between the stepped portion 628 of the outer race 302 and the outer race mating portion 702 of the flexible boot 368. The increased frictional engagement between the stepped portion 628 and the outer race mating portion 702 further aids in preventing the radial inversion of the flexible boot 368 thereby increasing the overall life and durability of the joint assembly 300.

Figure 12:
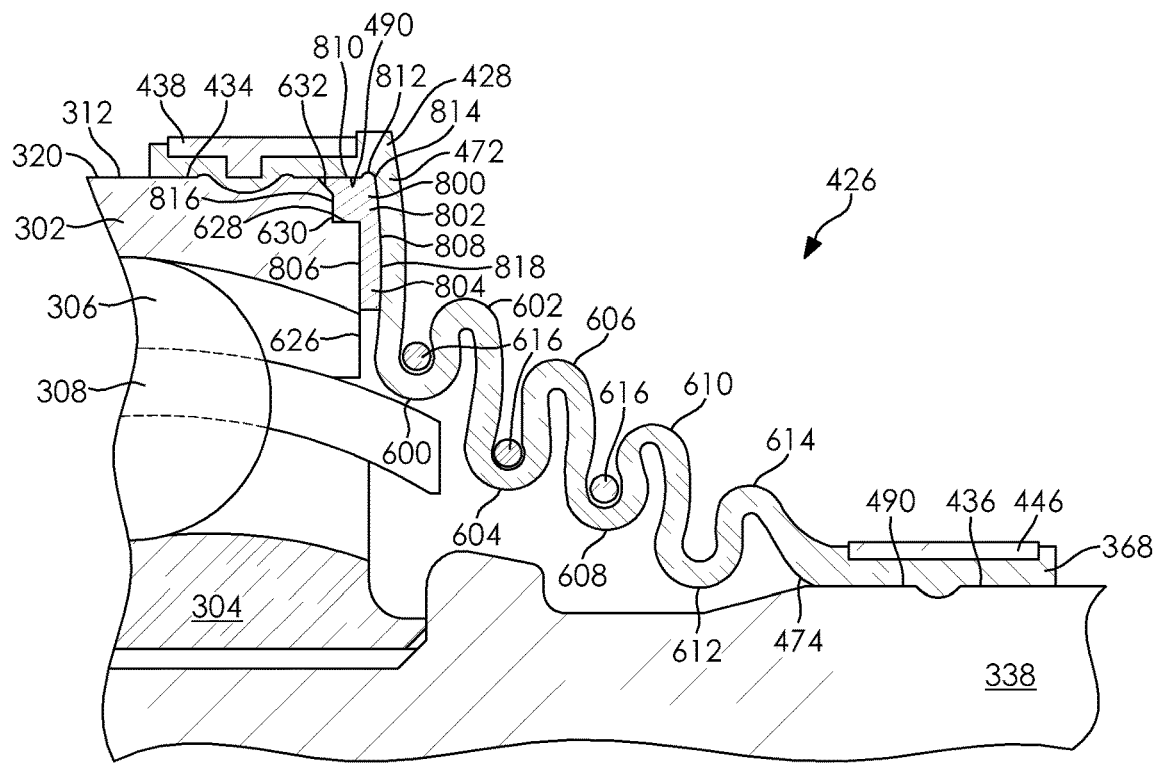
FIG. 12 is a cut-away schematic side-view a portion of the boot assembly illustrated in FIGS. 9-11 according to still yet embodiment of the disclosure.
Figure 12A:
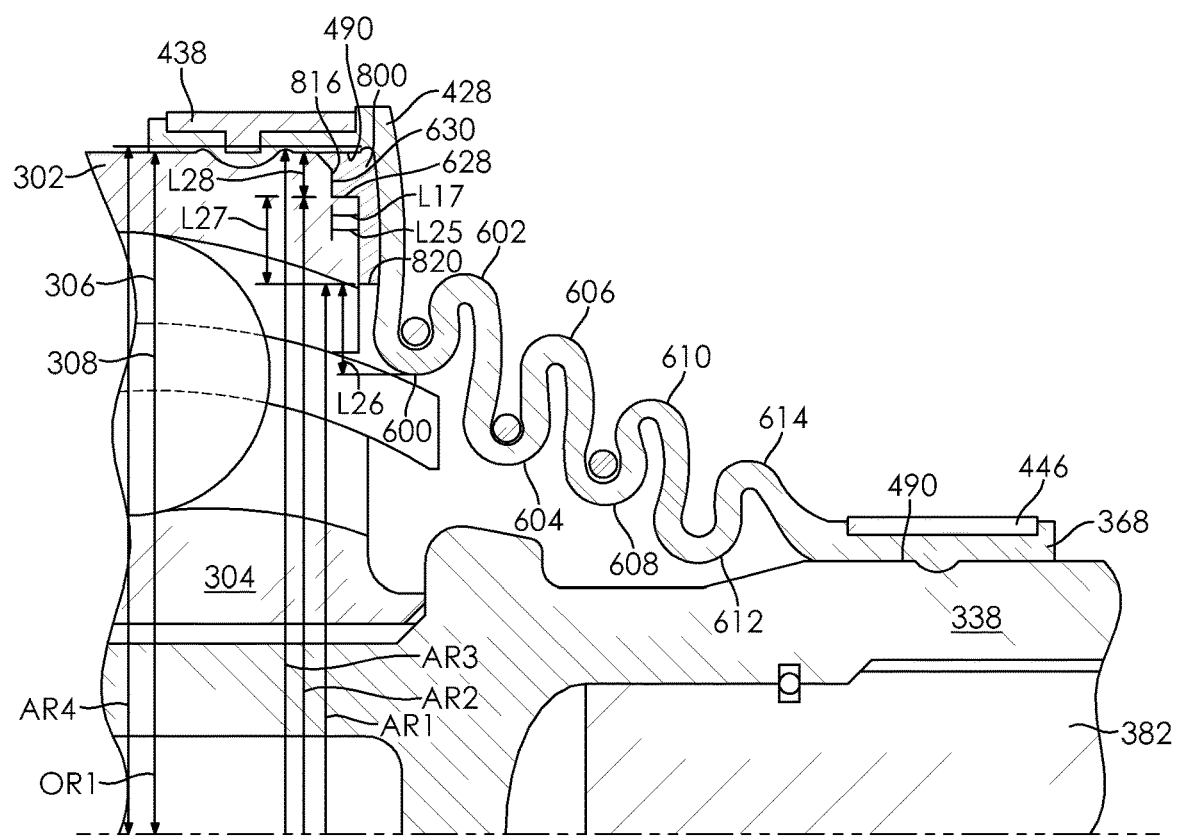
FIG. 12A cut-away schematic side-view a portion of the boot assembly illustrated in FIG. 12 of the disclosure.
Figure 12B:
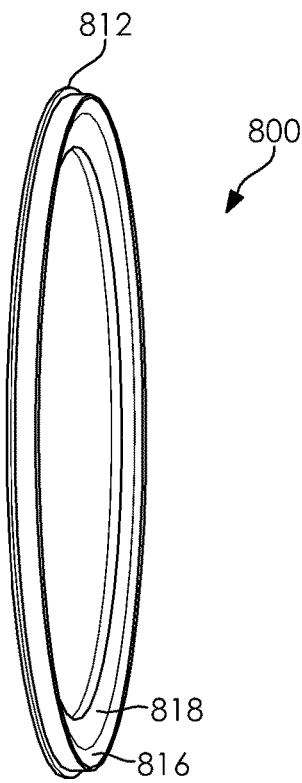
FIG. 12B is a schematic perspective view of an adapter of the boot assembly illustrated in FIGS. 12 and 12A of the disclosure.

FIGS. 12 and 12B is a cut-away schematic side-view a portion of the boot assembly illustrated in FIGS. 9-11 according to still yet embodiment of the disclosure. The boot assembly 426 illustrated in FIGS. 12 and 12B is the same as the boot assembly 426 illustrated in FIGS. 9-11, except where specifically noted. As illustrated in FIGS. 12 and 12B of the disclosure, the flexible boot 368 of the boot assembly 426 does not include the outer race mating portions 634 and 702 illustrated in FIGS. 9-11. In accordance with this embodiment of the disclosure, the boot assembly 426 includes an adapter 800. As a non-limiting example, the adapter 800 is made of a thermoplastic material, a polymeric material, a rubber material and/or a similar elastomeric material. It is within the scope of this disclosure that the adapter 800 can be made of the same material as the flexible boot 368 or the adapter can be made from a different material than that of the flexible boot 368. Additionally, as a non-limiting example, it is within the scope of this disclosure that material of the adapter 800 may have a greater hardness than the hardness of the material of the flexible boot 368. The increased hardness of the adapter 800 will further aid in preventing the flexible boot 368 from radially inverting when in operation thereby improving the overall life and durability of the joint assembly 300. As a non-limiting example, the adapter 800 may have a hardness ranging from approximately Shore D50 to Shore D80.

The adapter 800 is a substantially disc-shaped member having a radially outboard portion 802, a radially inboard portion 804, a first side 806 and a second side 808. Circumferentially extending, radially outboard, from at least a portion of a radially outboard end 810 of the adapter 800 is an increased diameter portion 812. As illustrated in FIGS. 12-12B of the disclosure, at least a portion of the increased diameter portion 812 of the adapter 800 is received within an adapter receiving recess 814 that circumferentially extends radially outboard along at least a portion of the inner surface 490 of the first shoulder portion 472 of the flexible boot 368. When the adapter 800 is inserted within the first end portion 428 of the flexible boot 368, the flexible boot 368 elastically deforms radially outboard allowing the increased diameter portion 812 to be received within the'adapter receiving recess 814. This aids in securing the adapter 800 to the flexible boot 368.

At least a portion of the second side 808 and/or at least a portion of the radially outboard end 810 of the adapter 800 is integrally connected to at least a portion of the inner surface 490 of the first end portion 428 of the flexible boot 368. As illustrated in FIGS. 12-12A of the disclosure and as a non-limiting example, at least a portion of the radially outboard end 810 of the adapter is integrally connected at least a portion of the inner surface 490 of the attachment portion 434 of the first end portion 428 of the flexible boot. Additionally, as illustrated in FIGS. 12 and 12A of the disclosure and as a non-limiting example, at least a portion of the second side 808 of the adapter 800 is integrally connected to at least a portion of the shoulder portion 472 connecting the attachment portion 434 to the first valley 600 of the flexible boot 368. It is within the scope of this disclosure and as a non-limiting example, that at least a portion of the second side 808 and/or radially outboard end 810 of the adapter 800 is integrally connected to at least a portion of the of the inner surface 490 of the flexible boot 368 by using one or more welds, one or more diffusion bonds, one or more adhesives, one or more solvents and/or one or more cements.

Extending circumferentially axially outboard from at least a portion of the first side 806 of the radially outboard portion 802 of the adapter 800 is an outer race mating portion 816. The outer race mating portion 816 has a size and a shape that is complementary to the stepped portion 628, the substantially vertical wall portion 630 and the chamfer portion 632 of the outer race 302. As illustrated in FIGS. 12 and 12A of the disclosure and as a non-limiting example, the outer race mating portion 816 of the adapter 800 has a linear axial distance L25 that is slightly less than or substantially equal to the linear axial distance L17 of the stepped portion 628 of the outer race 302. The linear axial distance L25 is defined as the distance from the first side 806 of the adapter 800 to the substantially vertical wall portion 630 of the stepped portion 628 of the outer race 302. The linear axial distance L25 is defined as the distance from the substantially vertical wall portion 630 of the outer race to the first side 806 of the adapter 800.

When the joint assembly 300 is articulated, at least a portion of the flexible boot 368 is compressed causing at least a portion of the outer race mating portion 816 of the adapter 800 to become frictionally engaged with at least a portion of the stepped portion 628 and/or the chamfer portion 632 of the outer race 302. The frictional engagement between the stepped portion 628 and the outer race mating portion 816 of the adapter 800 further aids in preventing the radial inversion of the flexible boot 368 thereby increasing the overall life and durability of the joint assembly 300.

Extending radially inboard from and disposed adjacent to the outer race mating portion 816 of the adapter 800 is a substantially disc-shaped portion 818. As illustrated in FIGS. 12 and 12A of the disclosure, the substantially disc-shaped portion 818 of the adapter 800 fills any gap that exists between the inner surface 490 of the flexible boot 368 and the axially outermost end 626 of the second end portion 312 of the outer race 302. The first side 806 of the substantially disc-shaped portion 818 of the adapter 800 has a shape that is complementary to the shape of the axially outermost end 626 of the second end portion 312 of the outer race 302. Additionally, the second side 808 of the adapter 800 has a shape that is complementary to the inner surface 490 of the portion of the first shoulder portion 472 of the flexible boot 368 connecting the attachment portion 434 to the first valley 600.

According to an embodiment of the disclosure and as a non-limiting example, the outer race mating portion 816 of the adapter 800 has a linear radial length L28 that is defined as the distance from the stepped portion 628 of the outer race 302 to the radially outboard end 810 of the adapter 800. Additionally, according to this embodiment of the disclosure, the adapter has a linear radial length L27 that is defined as the distance from the stepped portion 628 of the outer race 302 to the radially inboard end 820 of the adapter 800. In accordance with this embodiment of the disclosure and as a non-limiting example, the linear radial length L27 of the adapter is larger than the linear radial length L28 of the adapter 800.

The boot assembly 426 has a linear radial distance L26 that is defined as the distance between a radially inboard end 820 of the adapter 800 and the innermost point of the first valley 600 of the flexible boot 368. By reducing the linear radial distance L26 it aids in increasing the ability of the flexible boot 368 to resist radial inversion thereby increasing the overall life and durability of the joint assembly 300.

As illustrated in FIGS. 12-12B of the disclosure, the radially inboard end 820 of the adapter 800 has a radius AR1 that is less than the radius AR2 of the outer race mating portion 816 of the adapter 800. Additionally, as illustrated in FIGS. 12-12B, the adapter 800 has a radius AR3 at the radially outboard end 810 of the adapter 800 that is greater than the radius AR2 but is less than a radius AR4 of the increased diameter portion 812 of the radially outboard end 810 of the adapter 800. In accordance with an embodiment of the disclosure and as a non-limiting example, the radius AR3 of the adapter 800 is substantially equal to a radius OR1 of the second end portion 312 of the outer race 302 of the joint assembly 300.

Figure 13:
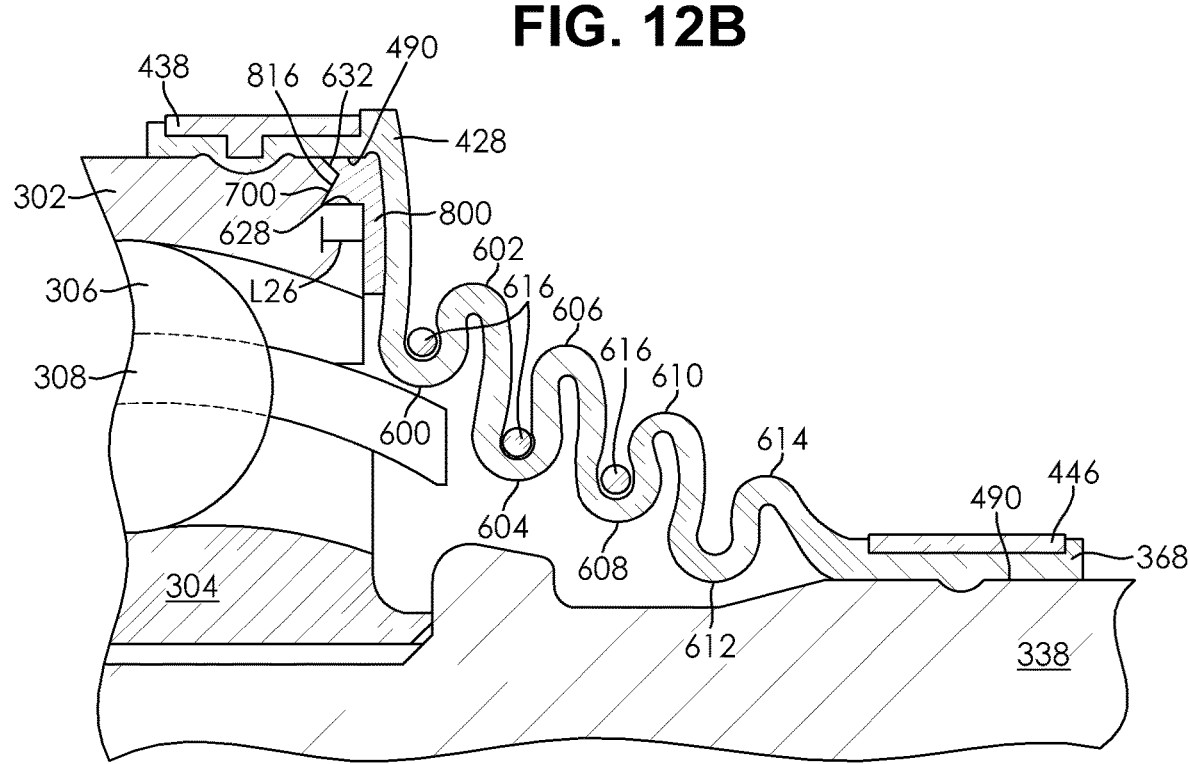
FIG. 13 is a cut-away schematic side-view of a portion of the boot assembly illustrated in FIGS. 12-12B of the disclosure according to still yet another embodiment of the disclosure.

FIG. 13 is a cut-away schematic side-view of a portion of the boot assembly 426 illustrated in FIGS. 12-12B of the disclosure according to still yet another embodiment of the disclosure. The boot assembly 426 illustrated in FIG. 13 is the same as the boot assembly 426 illustrated in FIGS. 12-12B, except where specifically noted. As illustrated in FIG. 13 of the disclosure, the stepped portion 628 of the outer race 302 does not include the substantially vertical wall portion 630 but does include the back cut portion 700. According to the embodiment of the disclosure illustrated in FIG. 13, the outer race mating portion 816 has a shape that is complementary to the stepped portion 628, the back cut portion 700 and the chamfer portion 632 of the outer race 302. In accordance with this embodiment of the disclosure, the adapter 800 has a linear axial length L26 that is greater than the linear axial distance L25 of the adapter 800 illustrated in FIGS. 12-12B. By making the linear axial distance L26 greater than the linear axial distance L25, it increases the amount of surface area contact between the stepped portion 628 of the outer race 302 and the outer race mating portion 816 of the adapter 800. This increases the overall amount of frictional engagement between the stepped portion 628 of the outer race 302 and the outer race mating portion 816 of the adapter 800. The increased frictional engagement between the stepped portion 628 and the outer race mating portion 816 further aids in preventing the radial inversion of the flexible boot 368 thereby increasing the overall life and durability of the joint assembly 300.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A joint assembly, comprising:
   a joint comprising an outer race;
      wherein an axially outermost end of said outer race has a stepped portion circumferentially extending along at least a portion of an outer surface of said axially outermost end of said outer race;
      wherein said stepped portion of said axially outermost end of said outer race has a chamfer portion;
   a flexible boot having an inner surface, an outer surface, a first end portion, a second end portion and an intermediate portion disposed between said first and second end portions of said flexible boot;
      wherein said first end portion of said flexible boot includes a first shoulder portion that connects an attachment portion to a first valley of said intermediate portion of said flexible boot;

wherein at least a portion of said attachment portion of said first end portion of said flexible boot is connected to at least a portion of said outer surface of said outer race;
an adapter having a radially outboard end, a radially inboard end, a first side, a second side, a radially outboard portion and a radially inboard portion;
wherein an outer race mating portion circumferentially extends from at least a portion of said first side of said adapter;
wherein said outer race mating portion of said adapter has a size and shape that is complementary to said stepped portion and said chamfer portion in said axially outermost end of said outer race; and
wherein at least a portion of at least one of said radially outboard end of said adapter and said second side of said adapter is integrally connected to at least a portion of said inner surface of said flexible boot;
wherein said stepped portion has a substantially vertical wall portion connecting said stepped portion of said axially outermost end of said outer race to said chamfer portion of said axially outermost end of said outer race; and
wherein said outer race mating portion of said adapter has a size and shape that is complementary to said stepped portion, said substantially vertical wall portion and said chamfer portion in said axially outermost end of said outer race.

2. The joint assembly of claim 1, wherein said joint is one of a universal joint, a constant velocity joint, and a direct pinion mount constant velocity joint.

3. The joint assembly of claim 1, wherein said stepped portion has a cut back portion connecting said stepped portion of said axially outermost end of said outer race to said chamfer portion of said axially outermost end of said outer race; and
wherein said outer race mating portion of said adapter has a size and shape that is complementary to said stepped portion, said cut back portion and said chamfer portion in said axially outermost end of said outer race.

4. The joint assembly of claim 1, wherein said radially outboard end of said adapter has an increased diameter portion circumferentially extending from at least a portion of said radially outboard end of said adapter; and
wherein at least a portion of said increased diameter portion on said radially outboard end of said adapter is received within an adapter receiving recess circumferentially extending radially outboard along at least a portion of said inner surface of said first shoulder portion of said flexible boot.

5. The joint assembly of claim 1, wherein a first end portion of said outer race is connected to a shaft; and
wherein said shaft is one of a drive shaft, a prop shaft, a Cardan shaft, a double cardan shaft, a universal joint shaft, and a universal coupling shaft.

6. The joint assembly of claim 1, further comprising an inner race;
wherein an inner surface of said inner race is drivingly connected to a first end portion of a drive sleeve;
wherein a second end portion of said drive sleeve is drivingly connected to a pinion shaft; and
wherein said pinion shaft has a pinion gear disposed at an end of said pinion shaft opposite said drive sleeve of said joint assembly.

7. The joint assembly of claim 1, wherein said adapter is made of a material having a hardness that is greater than a hardness of a material of said flexible boot.

8. The joint assembly of claim 1, wherein said adapter is integrally connected to at least a portion of an inner surface of said attachment portion of said first end portion of said flexible boot and said inner surface of said first shoulder portion of said first end portion of said flexible boot.

9. The joint assembly of claim 1, wherein said intermediate portion of said flexible boot comprises, in axial order, said first valley, a first peak, a second valley, a second peak, a third valley, a third peak, a fourth valley and a fourth peak.

10. The joint assembly of claim 9, wherein said outer surface of said flexible boot connecting said first shoulder portion to said first valley has an arcuate portion having a radius of curvature R1;
wherein said outer surface of said flexible boot connecting said first peak to said second valley has an arcuate portion having a radius of curvature R2;
wherein said outer surface of said flexible boot connecting said second peak to said third valley has an arcuate portion having a radius of curvature R3; and
wherein said outer surface of said flexible boot connecting said third peak to said fourth valley has an arcuate portion having a radius of curvature R4.

11. The joint assembly of claim 10, wherein said flexible boot has a linear axial distance L3 that is larger than a linear axial distance L4 of said flexible boot;
wherein said linear axial distance L3 is an outermost linear axial distance of said first valley of said flexible boot along said outer surface of said flexible boot and said linear axial distance L4 is an innermost linear axial distance between said first shoulder portion and said first peak of said flexible boot;
wherein said flexible boot has a linear axial distance L5 that is greater than a linear axial distance L6 of said flexible boot;
wherein said linear axial distance L5 is an outermost linear axial distance of said second valley of said flexible boot along said outer surface of said flexible boot and said linear axial distance L6 is an innermost linear axial distance between said first peak and said second peak of said flexible boot;
wherein said flexible boot has a linear axial distance L7 that is greater than a linear axial distance L8 of said flexible boot;
wherein said linear axial distance L7 is an outermost linear axial distance of said third valley of said flexible boot along said outer surface of said flexible boot and said linear axial distance L8 is an innermost linear axial distance between said second peak and said third peak of said flexible boot;
wherein said flexible boot has a linear axial distance L9 that is greater than a linear axial distance L10 of said flexible boot; and
wherein said linear axial distance L9 is an outermost linear axial distance of said fourth valley of said flexible boot along said outer surface of said flexible boot and said linear axial distance L10 is an innermost linear axial distance between said third peak and said fourth peak of said flexible boot.

12. The joint assembly of claim 9, wherein one or more snap-rings are disposed within at least one of said first valley, said second valley, said third valley and said fourth valley of said flexible boot.

13. The joint assembly of claim 12, wherein there is a gap between said one or more snap-rings and said outer surface of at least one of said first valley, said second valley, said third valley and said fourth valley of said flexible boot.

14. The joint assembly of claim 12, wherein said flexible boot further comprises at least one of a first snap-ring recess and a second snap-ring recess;
    wherein said first snap-recess circumferentially extends along at least a portion of said outer surface of said first valley;
    wherein said second snap-ring recess circumferentially extends along at least a portion of said outer surface of said second valley; and
    wherein one or more of said one or more snap rings are disposed within at least one of said first snap-ring recess and said second snap-ring recess in said flexible boot.

15. The joint assembly of claim 1, wherein a substantially disc-shaped portion of said adapter extends radially inboard from and is adjacent to said outer race mating portion of said adapter;
    wherein a first side of said substantially disc-shaped portion of said adapter has a shape that is complementary to and is in direct contact with said axially outermost end of said outer race; and
    wherein said second side of said adapter has a shape that is complementary to and is in direct contact with said inner surface of said portion of said first shoulder portion of said flexible boot connecting said attachment portion to said first valley.

16. The joint assembly of claim 15, wherein said substantially disc-shaped portion has a linear radial length L1 that is greater than a linear radial length L2 of said outer race mating portion of said adapter;
    wherein said linear radial length L1 is defined as a distance from said stepped portion of said outer race to said radially inboard end of said adapter; and
    wherein said linear radial length L2 is defined as a distance from said stepped portion of said outer race to said radially outboard end of said adapter.

\* \* \* \* \*